US008200863B2

(12) United States Patent  (10) Patent No.: US 8,200,863 B2
Ishihara  (45) Date of Patent: Jun. 12, 2012

(54) DEVICE MANAGEMENT APPARATUS, DEVICE MANAGEMENT SYSTEM, INFORMATION MANAGEMENT METHOD, INFORMATION MANAGEMENT PROGRAM AND RECORDING MEDIUM STORING THE PROGRAM THEREIN

(75) Inventor: Hisashi Ishihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/064,244

(22) Filed: Mar. 14, 2011

(65) Prior Publication Data

US 2011/0231584 A1  Sep. 22, 2011

(30) Foreign Application Priority Data

Mar. 17, 2010 (JP) ................................. 2010-060205

(51) Int. Cl.
  *G06F 13/14* (2006.01)
(52) U.S. Cl. ............................................. 710/64; 710/8
(58) Field of Classification Search .................... None
  See application file for complete search history.

(56) References Cited

U.S. PATENT DOCUMENTS

| 6,516,347 | B1 * | 2/2003 | Nakamura | 709/221 |
| 7,136,651 | B2 * | 11/2006 | Kalavade | 455/445 |
| 7,209,484 | B2 * | 4/2007 | Ohno et al. | 370/401 |
| 7,225,241 | B2 * | 5/2007 | Yada | 709/223 |
| 7,263,593 | B2 * | 8/2007 | Honda et al. | 711/205 |
| 7,472,179 | B2 | 12/2008 | Tarui et al. | |
| 7,979,430 | B2 * | 7/2011 | Mullin | 707/733 |
| 8,006,063 | B2 * | 8/2011 | Mimatsu et al. | 711/170 |
| 8,046,836 | B2 * | 10/2011 | Isokawa | 726/25 |

FOREIGN PATENT DOCUMENTS

| JP | 2004-054657 A | 2/2004 |
| JP | 2005151107 A | 6/2005 |
| JP | 2008152646 A | 7/2008 |
| JP | 2009129110 A | 6/2009 |

* cited by examiner

*Primary Examiner* — Cheng-Yuan Tseng
(74) *Attorney, Agent, or Firm* — Harness, Dickey & Pierce, P.L.C.

(57) ABSTRACT

A device management apparatus connected to one or more devices via a data transmission channel includes an input information holding unit for holding an input information group including one or more pieces of input information, each of which is to be connected to device information of a device; a device search unit for detecting the devices by a search; a device information acquiring unit for acquiring the device information from the devices; a cross-checking unit for cross-checking information items of the input information with those of the device information; and a registering and updating unit for performing data registration/update by, when the cross-checking unit determines that there is a common information item between the input information and the device information, connecting a piece of input information to the device information based on item entries of the common information item, and storing the connected information as registry management information.

12 Claims, 22 Drawing Sheets

FIG.4

| DEVICE IDENTIFICATION | ADMINISTRATOR | LOCATION | ASSET MANAGEMENT | ... |
|---|---|---|---|---|
| 222.111.11.5 | User01 | TOKYO | ASSET No.1 | ... |
| 222.333.12.2 | User02 | OSAKA | ASSET No.10 | ... |
| ... | ... | ... | ... | ... |

| DEVICE IDENTIFICATION | MODEL NAME | STATUS | OPTION CONFIGURATION | ... |
|---|---|---|---|---|
| 222.111.11.5 | MFP02 | NORMAL | A+B+C | ... |
| 222.333.12.2 | PRN03 | NORMAL | A+C+D | ... |
| ... | ... | ... | ... | ... |

FIG.6

| DEVICE IDENTIFICATION | MODEL NAME | STATUS | OPTION CONFIGURATION | ADMINISTRATOR | LOCATION | ASSET MANAGEMENT |
|---|---|---|---|---|---|---|
| 222.111.11.5 | MFP02 | NORMAL | A+B+C | User01 | TOKYO | ASSET No.1 |
| 222.333.12.2 | PRN03 | NORMAL | A+C+D | User02 | OSAKA | ASSET No.10 |
| .... | .... | .... | .... | .... | .... | .... |

RA: MODEL NAME, STATUS, OPTION CONFIGURATION
RB: ADMINISTRATOR, LOCATION, ASSET MANAGEMENT

| DEVICE IDENTIFICATION | MODEL NAME | STATUS | OPTION CONFIGURATION | ADMINISTRATOR | LOCATION | ASSET MANAGEMENT | ... |
|---|---|---|---|---|---|---|---|
| ... | ... | ... | ... | ... | ... | ... | ... |
| 222.333.12.2 | (NULL) | (NULL) | (NULL) | (NULL) | (NULL) | (NULL) | ... |
| ... | ... | ... | ... | ... | ... | ... | ... |

25D (B)

| DEVICE IDENTIFICATION | MODEL NAME | STATUS | OPTION CONFIGURATION | ADMINISTRATOR | LOCATION | ASSET MANAGEMENT | ... |
|---|---|---|---|---|---|---|---|
| ... | ... | ... | ... | ... | ... | ... | ... |
| 222.333.12.2 | PRN03 | NORMAL | A+C+D | User02 | OSAKA | ASSET No.10 | ... |
| ... | ... | ... | ... | ... | ... | ... | ... |

| DEVICE IDENTIFICATION | | ADMINISTRATOR | LOCATION | ASSET MANAGEMENT | ... |
| --- | --- | --- | --- | --- | --- |
| IP ADDRESS | MAC ADDRESS | | | | |
| 222.111.11.5 | 1b:c2:33:・・・:XX | User01 | TOKYO | ASSET No.1 | ... |
| 222.333.12.2 | ab:d5:41:・・・:XX | User02 | OSAKA | ASSET No.10 | ... |
| ... | ... | ... | ... | ... | ... |

| USER IDENTIFICATION | DIVISION NAME | ASSET MANAGEMENT | ... | 400D₁ |
|---|---|---|---|---|
| User01 | △△ DEPARTMENT | ASSET No.A01-XX | ... | |
| ... | ... | ... | ... | |
| User05 | ●● DEPARTMENT | ASSET No.B01-XX | ... | |
| ... | ... | ... | ... | |
| User11 | ×× DEPARTMENT | ASSET No.D10-XX | ... | |
| ... | ... | ... | ... | |

FIG.11B

| LOCATION | DIVISION NAME | SEGMENT | |
|---|---|---|---|
| | | | 400D2 |
| TOKYO | △△ DEPARTMENT | 222.111.11.001-256 | ... |
| ... | ... | ... | ... |
| OSAKA | ●● DEPARTMENT | 222.333.12.001-256 | ... |
| ... | ... | ... | ... |
| SAPPORO | ×× DEPARTMENT | 222.555.43.001-256 | ... |
| ... | ... | ... | ... |

FIG.13

| USER IDENTIFICATION | REGISTRATION CONTENTS | | | DB IDENTIFICATION |
|---|---|---|---|---|
| | DIVISION NAME | DIVISION NAME | ASSET MANAGEMENT | USER DB |
| LOCATION | | | SEGMENT | NETWORK MAP DB |
| ... | ... | ... | ... | ... |

| DEVICE IDENTIFICATION | MODEL NAME | STATUS | OPTION CONFIGURATION | ADMINISTRATOR | LOCATION | DIVISION NAME | ... |
|---|---|---|---|---|---|---|---|
| ... | ... | ... | ... | ... | ... | ... | ... |
| 222.333.12.2 | (NULL) | (NULL) | (NULL) | (NULL) | (NULL) | (NULL) | ... |
| ... | ... | ... | ... | ... | ... | ... | ... |

RN { 25D (6) REGISTERING OR UPDATING REGISTRY MANAGEMENT INFORMATION
[STORING ITEM ENTRIES OF ITEMS "ADMINISTRATOR", "LOCATION" AND "DIVISION NAME"]
→

| DEVICE IDENTIFICATION | MODEL NAME | STATUS | OPTION CONFIGURATION | ADMINISTRATOR | LOCATION | DIVISION NAME | ... |
|---|---|---|---|---|---|---|---|
| ... | ... | ... | ... | ... | ... | ... | ... |
| 222.333.12.2 | PRN05 | NORMAL | F+G | User05 | OSAKA | ●● DEPARTMENT | ... |
| ... | ... | ... | ... | ... | ... | ... | ... |

(5) REFERRING TO DB LIST
[USER DB HAVING ITEM
"DIVISION NAME" IS PRESENT]

28D

| REGISTRATION CONTENTS | | | | DB IDENTIFICATION |
|---|---|---|---|---|
| USER IDENTIFICATION (EQUIVALENT TO ITEM "ADMINISTRATOR") | DIVISION NAME | ASSET MANAGEMENT | · · · · | USER DB |
| LOCATION | DIVISION NAME | SEGMENT (EQUIVALENT TO ITEM "DEVICE IDENTIFICATION") | · · · · | NETWORK MAP DB |
| · · · · | · · · · | · · · · | · · · · | · · · · |

}R3

(6) ACCESSING USER DB
[ACQUIRING MANAGEMENT
INFORMATION
(INFORMATION ITEMS
AND ITEM ENTRIES)]

400D₁

| USER IDENTIFICATION (EQUIVALENT TO ITEM "ADMINISTRATOR") | DIVISION NAME | ASSET MANAGEMENT | · · · · |
|---|---|---|---|
| · · · · | · · · · | · · · · | · · · · |
| User05 | ●● DEPARTMENT | ASSET No. B01-XX | · · · · |
| · · · · | · · · · | · · · · | · · · · |

}R4

(7) CROSS-CHECKING INPUT
INFORMATION GROUP WITH
MANAGEMENT INFORMATION OF DB
[ITEM "ADMINISTRATOR" IS
PRESENT AND ITEM ENTRIES
MATCH WITH EACH OTHER]

22D

| ADMINISTRATOR | ASSET MANAGEMENT | · · · · |
|---|---|---|
| User05 | ASSET No. B01-XX | · · · · |
| · · · · | · · · · | · · · · |

}R5

(8) CONNECTING INPUT INFORMATION TO DEVICE INFORMATION
[CONNECTING USING ITEM "ADMINISTRATOR"]

FIG.19

| DEVICE IDENTIFICATION | MODEL NAME | STATUS | OPTION CONFIGURATION | ADMINISTRATOR | DIVISION NAME | ASSET MANAGEMENT | ... |
|---|---|---|---|---|---|---|---|
| ... | ... | ... | ... | ... | ... | ... | ... |
| 222.333.12.2 | (NULL) | (NULL) | (NULL) | (NULL) | (NULL) | (NULL) | ... |
| ... | ... | ... | ... | ... | ... | ... | ... |

25D (9) REGISTERING OR UPDATING REGISTRY MANAGEMENT INFORMATION
[STORING ITEM ENTRIES OF ITEMS "ADMINISTRATOR", "DIVISION NAME" AND "ASSET MANAGEMENT"]

→

| DEVICE IDENTIFICATION | MODEL NAME | STATUS | OPTION CONFIGURATION | ADMINISTRATOR | DIVISION NAME | ASSET MANAGEMENT | ... |
|---|---|---|---|---|---|---|---|
| ... | ... | ... | ... | ... | ... | ... | ... |
| 222.333.12.2 | PRN05 | NORMAL | F+G | User05 | ●● DEPARTMENT | ASSET No. B01-XX | ... |
| ... | ... | ... | ... | ... | ... | ... | ... |

| CHECKING ORDER | ITEM NAME |
|---|---|
| 1 | DIVISION NAME |
| 2 | USER IDENTIFICATION |
| 3 | DEVICE IDENTIFICATION |
| .... | .... |

US 8,200,863 B2

DEVICE MANAGEMENT APPARATUS, DEVICE MANAGEMENT SYSTEM, INFORMATION MANAGEMENT METHOD, INFORMATION MANAGEMENT PROGRAM AND RECORDING MEDIUM STORING THE PROGRAM THEREIN

CROSS-REFERENCE TO RELATED APPLICATIONS

This patent application is based upon and claims the benefit of priority of Japanese Patent Application No. 2010-060205 filed on Mar. 17, 2010 the entire contents of which are incorporated herein by reference.

BACKGROUND OF THE INVENTION

1. Field of the Invention

The present invention is generally directed to a device management apparatus and device management system for managing one or more devices connected via a data transmission channel, and in particular to a technology for integrally managing various types of information by connecting information input in advance to device information.

2. Description of the Related Art

Device management systems have been known which acquire device information from each one or more devices connected to a network or the like and manage the devices based on the acquired information.

For example, Patent Document 1 discloses a device management server which acquires device identification information, such as an IP address (Internet Protocol address) or a MAC address (Media Access Control address), from each device, then automatically detects a change in a device, such as an addition or deletion of the device, in a system which includes a large number of devices, and manages the physical position of each device.

In addition, for example, Patent Document 2 discloses a network device management apparatus capable of setting administrator information and the like in addition to the device information.

Thus, in recent years, there has been a demand for a device management system capable of not only managing device information acquired from each device but also integrally managing information by connecting the device information to various types of information (for example, information that cannot be acquired from a device, such as "administrator information" and "asset management information") handled in a user environment.

[Patent Document 1] Japanese Laid-open Patent Application Publication No. 2005-151107

[Patent Document 2] Japanese Laid-open Patent Application Publication No. 2004-54657

However, according to conventional information management methods, the information connection between various types of information handled in a user environment and information of each device (hereinafter referred to as "device information") can be made only after the device is searched for and registered by a device management apparatus (i.e., only after the installation of the device). In the case, for example, when a large number of devices are installed in the user environment, the devices are installed in stages, and the administrator has to manually perform information connection in each stage via the device management apparatus. The information connection is a burdensome operation for the administrator. In addition, the manual information connection takes time and a time lag until registry management information becomes the latest by the connection operation is likely to occur, which may prevent quick information management. Furthermore, accurate information management may not be achieved due to incorrect information connection.

For these reasons, there is a demand for a mechanism of dynamically connecting information input preliminarily (i.e., before the installation of a device) to device information at the time of the installation of the device in a user environment so as to reduce the workload of the administrator.

SUMMARY OF THE INVENTION

In view of the above-described problems with the conventional technologies, embodiments of the present invention may provide a device management apparatus, a device management system, an information management method, an information management program and a recording medium storing the program therein, all of which are capable of relieving the administrator from the operation of connecting various types of information handled in a user environment to device information.

One aspect of the present invention may be to provide a device management apparatus connected to one or more devices via a predetermined data transmission channel. The device management apparatus includes an input information holding unit configured to hold, in a first predetermined storage area, an input information group including one or more pieces of input information, each piece of which is to be connected to device information of a different one of the devices; a device search unit configured to detect the devices by a device search; a device information acquiring unit configured to acquire the device information from each of the detected devices; a cross-checking unit configured to, with reference to the input information group, cross-check information items of the pieces of input information with information items of the device information; and a registering and updating unit configured to carry out data registration or update by, in the case when the cross-checking unit determines that there is a common information item between the input information and the device information, connecting a piece of input information to the device information based on item entries of the piece of input information and the device information under the common information item, and storing the connected information in a second predetermined storage area as registry management information.

Another aspect of the present invention is a device management system in which, via a predetermined data transmission channel, one or more devices are connected to a device management apparatus for managing the devices. Each of the devices includes a device information transmitting unit configured to transmit device information of the device to the device management apparatus. The device management apparatus includes an input information holding unit configured to hold, in a first predetermined storage area, an input information group including one or more pieces of input information, each piece of which is to be connected to device information of a different one of the devices; a device search unit configured to detect the devices by a device search; a device information acquiring unit configured to acquire the device information from each of the detected devices; a cross-checking unit configured to, with reference to the input information group, cross-check information items of the pieces of input information with information items of the device information; and a registering and updating unit configured to carry out data registration or update by, in the case when the cross-checking unit determines that there is a common information item between the input information and the device information, connecting a piece of input information to the device information based on item entries of the piece of input information and the device information under the common information item, and storing the connected information in a second predetermined storage area as registry management information.

Yet another aspect of the present invention is a non-transitory computer-readable storage medium storing an information management program for causing a device management apparatus to execute a process. The device management apparatus is connected to one or more devices via a predetermined data transmission channel and includes an input information holding unit configured to hold, in a predetermined first storage area, an input information group including one or more pieces of input information, each piece of which is to be connected to device information of a different one of the devices. The process includes a device search step of detecting the devices by a device search; a device information acquiring step of acquiring the device information from the detected devices; a cross-checking step of, with reference to the input information group, cross-checking information items of the pieces of input information with information items of the device information; and a registering and updating step of carrying out data registration or update by, in the case when the cross-checking unit determines that there is a common information item between the input information and the device information, connecting a piece of input information to the device information based on item entries of the piece of input information and the device information under the common information item, and storing the connected information in a second predetermined storage area as registry management information.

Additional objects and advantages of the embodiments will be set forth in part in the description which follows, and in part may be obvious from the description, or may be learned by practice of the invention. The object and advantages of the invention may be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 4 is a diagram showing a first data example of an input information group according to the first embodiment of the present invention;

FIG. 5 is a diagram showing a data example of a device information group according to the first embodiment of the present invention;

FIG. 6 is a diagram showing a data example of a registry management information group according to the first embodiment of the present invention;

FIG. 8 shows an example of data transition in the registry management information group according to the first embodiment of the present invention;

FIG. 9 is a diagram showing a second data example of the input information group according to the first embodiment of the present embodiment;

FIGS. 11A and 11B show examples of data included in databases according to the second embodiment of the present invention;

FIG. 13 shows a data example of a DB list according to the second embodiment of the present invention;

FIG. 16 is a diagram showing a first example of data transition of the registry management information group according to the second embodiment of the present invention;

FIG. 18 is a diagram showing a third 10, example of the data reference operation implemented at the time of information cross-checking according to the second embodiment of the present invention;

FIG. 19 is a diagram showing a second example of the data transition of the registry management information group according to the second embodiment of the present invention;

FIG. 21 is a diagram showing a data example of checking order decision information according to a modification of the present invention.

DETAILED DESCRIPTION OF THE PREFERRED EMBODIMENTS

Figure 1:
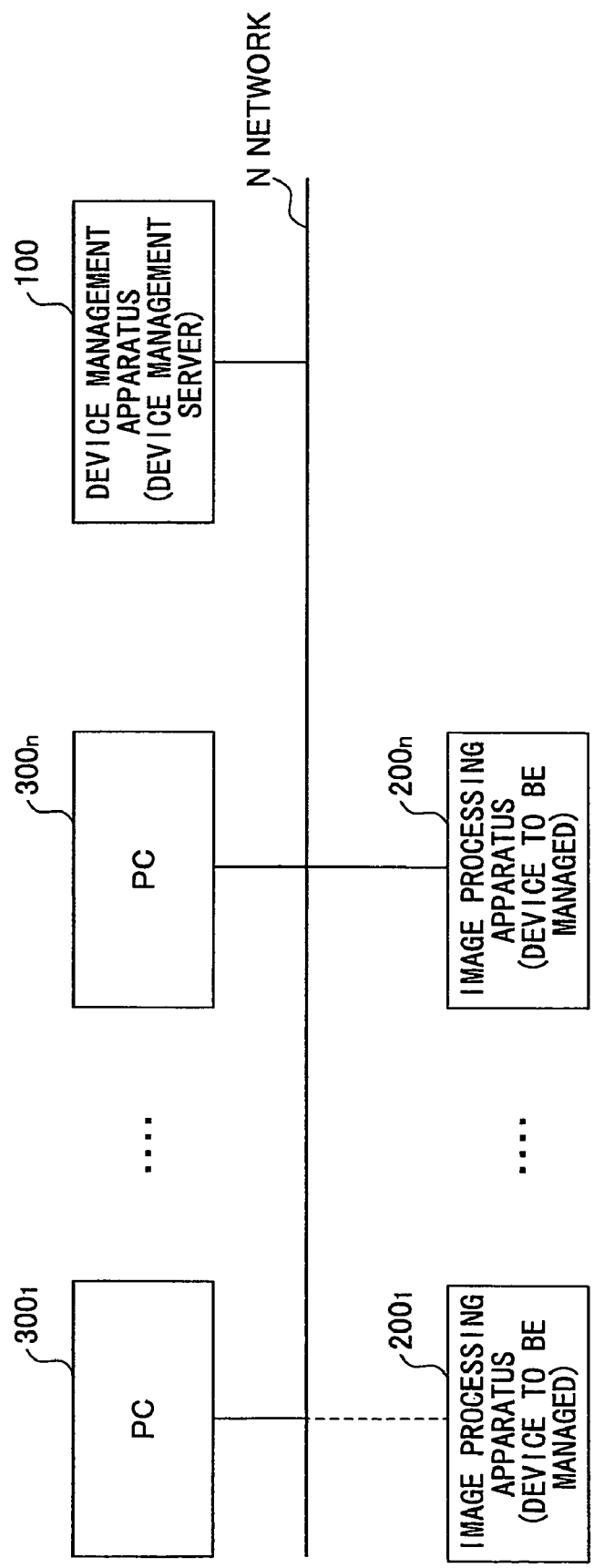
FIG. 1 illustrates a configuration example of a device management system according to a first embodiment of the present invention.

Embodiments that describe the best mode for carrying out the present invention (hereinafter, referred to as "embodiments") are explained next with reference to the drawings.
[First Embodiment]
System Configuration FIG. 1 illustrates a configuration example of a device management system 1 according to a first embodiment of the present invention. The system configuration example of FIG. 1 shows one or more image processing apparatuses (devices to be managed) 200 and a device management apparatus (device management server) 100 that are connected by a data transmission channel N, such as a network (for example, a LAN (Local Area Network)).

The image processing apparatuses 200 are used for office operations, and examples of such are a MFP (Multifunction Peripheral) and a LP (Laser Printer). Each of the image processing apparatuses 200 after being installed is an object managed by the device management apparatus 100. The image processing apparatuses 200 are hereinafter referred to simply as "devices 200".

As shown in FIG. 1, the device management system 1 also includes one or more PCs (Personal Computers) 300, each of which is an information processing apparatus, and is used by the user to, for example, input information to be connected to device information and view registry management information.

The device management apparatus 100 is an information processing apparatus for managing the devices 200 in an integrated fashion based on device information (for example, "device identification information" and "status information") acquired from each of the devices 200. The integrated management includes, for example, monitoring and operation of the devices 200 and information management of the devices 200. In terms of the information management according to the present embodiment, integrated information management is considered here to be where information handled in the system is connected to the device information of the devices 200 therein. Therefore, in addition to acquiring the device information, the device management apparatus 100 also receives information input from a PC 300 (reception of input information) and responds to an information viewing request (transmission of registry management information).

With the above-described system configuration, the device management system 1 is able to provide various management services related to the devices 200 and information.

Hardware Configuration

Figure 2:
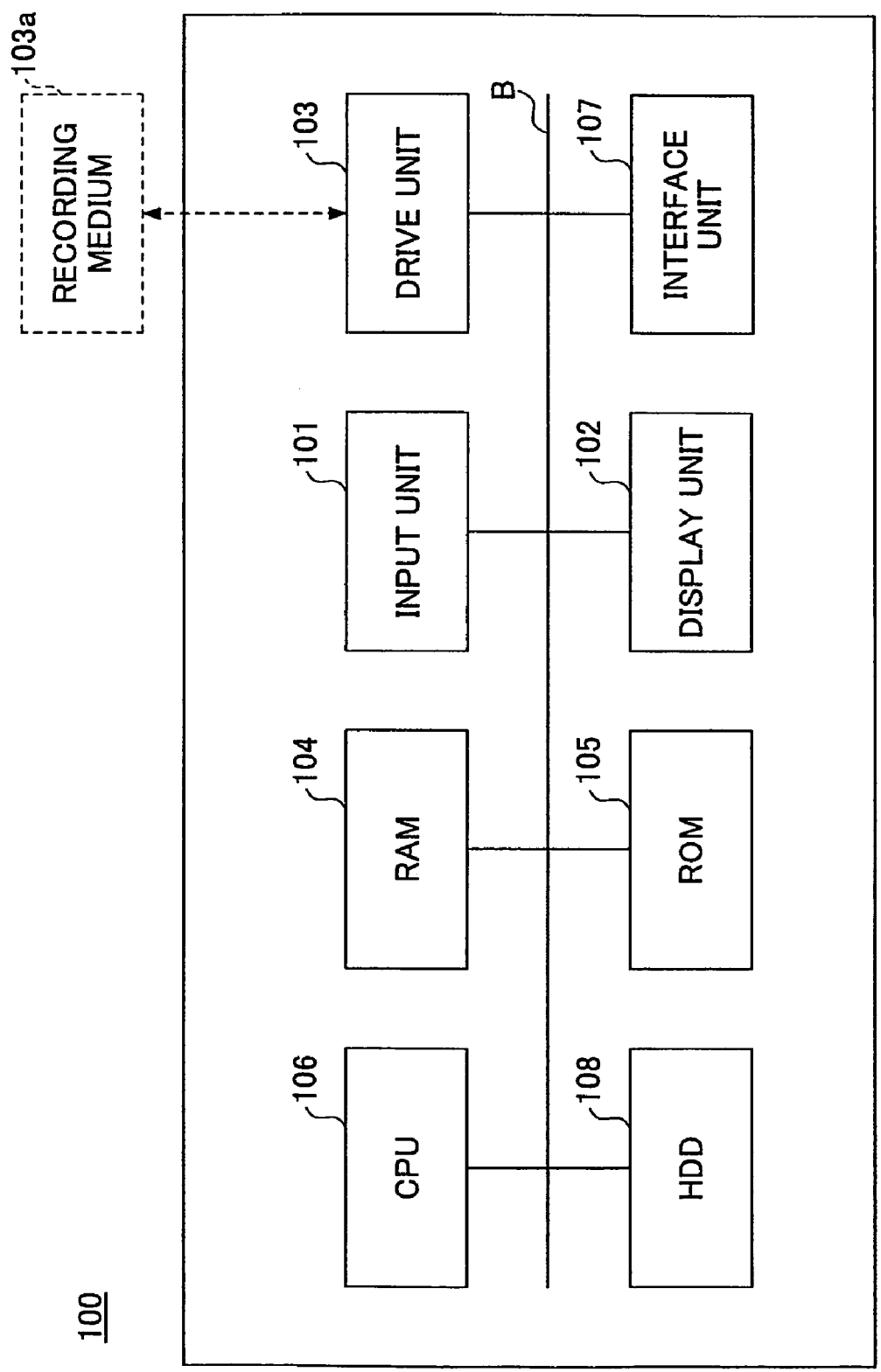
FIG. 2 illustrates an example of a hardware configuration of the device management apparatus according to the first embodiment of the present invention.

FIG. 2 illustrates an example of the hardware configuration of the device management apparatus 100 according to the present embodiment. As shown in FIG. 2, the device management apparatus 100 includes an input unit 101, a display unit 102, a drive unit 103, a RAM (Random Access Memory) 104, a ROM (Read Only Memory) 105, a CPU (Central Processing Unit) 106, an interface unit 107, a HDD (Hard Disk Drive) 108 and the like, which are connected to one another using a bus B.

The input unit 101 includes a key-board, a mouse and the like, and is used to input an operation signal to the device management apparatus 100. The display unit 102 includes a display and displays a result of processing performed by the device management apparatus 100.

The interface unit 107 connects the device management apparatus 100 to the data transmission channel N. Via the interface unit 107, the device management apparatus 100 is able to communicate with the devices 200 and the PCs 300.

The HDD 108 is a nonvolatile storage device for storing various types of programs and data. The stored programs and data include, for example, an OS (Operating System) which is basic software, such as "Windows (registered trademark)" and "UNIX (registered trademark)" for controlling the entire device management apparatus 100 and applications for providing various functions in the information processing system. The HDD 108 manages the stored programs and data using a predetermined file system and/or DB (Data Base).

The drive unit 103 provides an interface with a detachable recording medium 103a. Via the drive unit 103, the device management apparatus 100 is able to read and/or write from/to the recording medium 103a. Examples of the recording medium 103a include a floppy (registered trademark) disk, a CD (Compact Disk), a DVD (Digital Versatile Disk), an SD memory card and a USB (Universal Serial Bus) memory.

The ROM 105 is a nonvolatile semiconductor memory (memory device) capable of holding internal data even if the power is turned off. The ROM 105 stores a BIOS (Basic Input/Output System) which is executed when the device management apparatus 100 starts and data of system and network related settings of the device management apparatus 100.

The RAM 104 is a volatile semiconductor memory (memory device) for temporarily holding programs and data read from the aforementioned various types of memory devices. The CPU 106 controls the entire device management apparatus 100 by loading a program into the RAM 104 and executing the program.

With the above-described hardware configuration, the device management apparatus 100 is able to provide various types of information processing services of installed software.

Information Management Function

Next is described an information management function according to the present embodiment.

The device management apparatus 100 according to the present embodiment receives, prior to the installation of a device 200, an input of information which is to be connected to device information of the device 200, and stores the received information in a predetermined storage area as input information. In this condition, the device management apparatus 100 detects the device 200 by a device search and acquires the device information from the detected device 200. Subsequently, the device management apparatus 100 refers to an input information group (to be described in detail below), which is made up of one or more pieces of input information, to cross-check information items of the input information group with those of the device information, and determines whether there is a common information item between them. Then, in the case when there is a common information item, the device management apparatus 100 acquires, based on an item entry of the common information item, a piece of input information to be connected to the device information from the input information group. The device management apparatus 100 connects the acquired input information to the device information, and stores the connected information in a predetermined storage area as registry management information to thereby carry out data registration or update. The device management apparatus 100 has such an information management function.

According to conventional information management methods, connection between various types of information handled in a user environment and device information can be made only after a device 200 corresponding to the device information is searched for and registered by the device management apparatus 100 (i.e., after the installation of the device 200). In the case when a large number of devices 200 are installed in a user environment, the installation of the devices 200 takes place in stages. Accordingly, the administrator has to manually perform information connection in each stage via the device management apparatus 100, which is quite burdensome for the administrator.

To avoid this conventional burden, the device management apparatus 100 according to the present embodiment has a mechanism for dynamically connecting information input preliminarily (input information) to device information of a device 200 at the time of the installation of the device 200.

Herewith, the device management apparatus 100 according to the present embodiment is able to relieve the administrator from the workload of performing such information connection.

Figure 3:
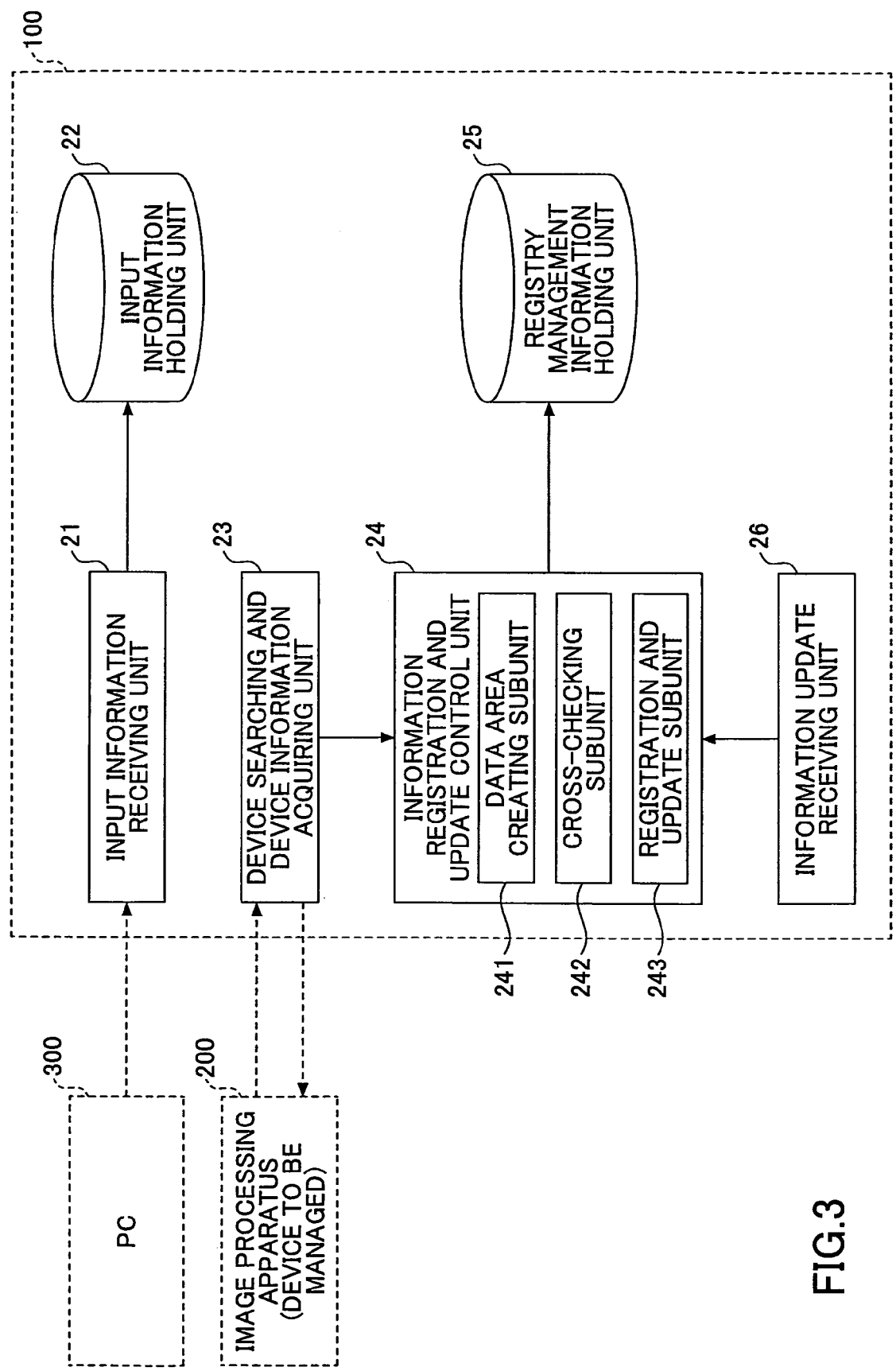
FIG. 3 is a diagram showing a functional configuration example of the device management apparatus according to the first embodiment of the present invention.

Next are described the functional configuration and operation of the device management apparatus 100 according to the present embodiment. FIG. 3 is a diagram showing a functional configuration example of the device management apparatus 100 according to the present embodiment. As shown in FIG. 3, the device management apparatus 100 includes an input information receiving unit 21, a device searching and device information acquiring unit 23, an information registration and update control unit 24, an information update receiving unit 26 and the like.

The input information receiving unit 21 is a functional unit for receiving information to be connected to device information of a device 200, which information is input prior to the installation of the device 200. This information is referred to as "input information" in this specification. The input information receiving unit 21 provides a predetermined input screen having, for example, a GUI (Graphical User Interface) to the respective PCs 300 via the network, and receives information as shown in FIG. 4, through the input screen. The input information receiving unit 21 stores the received information in an input information holding unit 22, in which the received information is held. The input information holding unit 22 is, for example, a predetermined storage area in a storage device (for example, the HDD 108) of the device management apparatus 100.

FIG. 4 is a diagram showing a first data example of an input information group 22D according to the present embodiment. FIG. 4 illustrates an example of data in which various information items, such as device identification, administrator, location, and asset management are associated with each other. Under the item "device identification", identification information of each device 200 (device identification information) is entered. Item entries of this item include a network setting value, such as an IP address and a MAC address, and a device unique value, such as a serial number (device number). Under the item "administrator", identification information of a user (user identification information) who manages a corresponding device 200 is entered. Item entries of this item include a user name and a user ID. Under the item "location", information indicating an installation site of a corresponding device 200 (location information) is entered. Item entries of this item include a regional name and a regional ID. Under the item "asset management", information for managing a corresponding device 200 as an asset (asset management information) is entered. Item entries of this item include an asset number.

The input information group 22D is made up of one or more pieces of input information, each piece of which is one data set where the aforementioned information items are associated with each other and is treated as a candidate to be connected to the device information in question.

Thus, with the above-mentioned data structure of the input information group 22D, it is possible to specify, in the one or more received pieces of input information, one piece to be connected to the device information based on device identification information.

Note that the data format of the input information group 22D is not limited to the table format shown in the above example, and may be a CSV (Comma Separated Values) data format or an XML (Extensible Markup Language) data format. Therefore, the input information receiving unit 21 may receive information by reading, via the drive input 103, the recording medium 103a having the input information group 22D.

The device searching and device information acquiring unit 23 is a functional unit for searching for one or more devices 200 and acquiring device information from each of the detected devices 200. The device searching and device information acquiring unit 23 searches for one or more devices 200 connected to the network by broadcast communication or the like. Based on the search result (network response result), the device searching and device information acquiring unit 23 acquires information, as shown in FIG. 5, from the devices 200. The device searching and device information acquiring unit 23 stores the acquired information in a predetermined storage area of, for example, a memory device (e.g. the RAM 104) of the device management apparatus 100.

FIG. 5 is a diagram showing a data example of a device information group according to the present embodiment. FIG. 5 illustrates an example of data in which various information items, such as a device identification, a model name, a status, and an option configuration, are associated with each other. The item "device identification" indicates device identification information. The item "model name" indicates model information of a corresponding device 200. Item entries of this item include a name of a model. The item "status" indicates status information of a corresponding device 200. Item entries of this item include normal status and abnormal status. The item "option configuration" indicates configuration information regarding optional equipment of a corresponding device 200. Item entries of this item include an identifier of each installed option.

The device information group is made up of one or more pieces of device information, each piece of which is one data set where the aforementioned information items are associated with each other. The number of the information pieces corresponds to that of the detected devices 200.

Thus, with the above-mentioned data structure of the device information group, it is possible to specify, in the one or more pieces of device information acquired from the detected devices 200, one piece corresponding to a specific one of the detected devices 200 based on device identification information.

Note that device information of each device 200 is acquired by a polling process in the above description; however, the method of acquiring the device information is not limited to this case. For example, the device information may be acquired by the method in which each device 200 detects a change in its own status and dynamically transmits the latest device information using a Trap command or the like.

The information registration and update control unit 24 is a functional unit for controlling) registration and update of management information formed by connecting appropriate input information to device information. The information registration and update control unit 24 connects appropriate input information to device information acquired from the corresponding detected devices 200 and registers the connected information, as shown in FIG. 6. Note here that the management information formed by connecting appropriate input information to device information acquired from each of the detected devices 200 is referred to as "registry management information", and the information shown in FIG. 6 is a registry management information group 25D which is made up of one or more pieces of such registry management information. The information registration and update control unit 24 stores the registry management information group 25D in a registry management information holding unit 25. The registry management information holding unit 25 is, for example, a predetermined storage area in a storage device (for example, the HDD 108) of the device management apparatus 100. In addition, the information registration and update control unit 24 updates contents (i.e., information items and item entries) of each piece of the registry management information according to change in corresponding device information or input information.

FIG. 6 is a diagram showing a data example of the registry management information group 25D according to the present embodiment. FIG. 6 illustrates an example of data in which the device information group of FIG. 5 (the reference symbol RA in FIG. 6) and the input information group 22D of FIG. 4 (the reference symbol RB in FIG. 6) are connected to each other. In addition, the connection to form the registry management information group 25D of FIG. 6 is made according to an information item common to the device information group and the input information group 22D (i.e., the item "device identification").

The registry management information group 25D is made up of one or more pieces of registry management information, each piece of which is one data set where the information items are associated with each other. The number of the information pieces corresponds to that of the detected devices 200.

Thus, with the above-mentioned data structure of the registry management information group 25D, it is possible to specify, in the registry management information group 25 with one or more pieces of registry management information having been registered for the respective detected devices 200, one piece of registry management information corresponding to a specific device 200. Herewith, device information of each device 200 and various types of information handled in the system are connected, and the device management apparatus 100 is able to provide information managed in an integrated fashion.

The information registration and update control unit 24 includes a data area creating subunit 241, a cross-checking subunit 242 and a registration and update subunit 243 in order to perform the above-mentioned information management.

The data area creating subunit 241 creates, in the registry management information holding unit 25, a data area for storing new registry management information. When a device 200 is detected by a device search (at the time of the installation of the device 200), the data area creating subunit 241 makes an access to the registry management information holding unit 25 based on the device identification information included in the device information received from the device 200 at the time of the detection. The data area creating subunit 241 then checks whether an area for registry management information of the detected device 200 has already been secured. That is, the data area creating subunit 241 checks whether the detected device 200 has yet to be registered. If a data area for the detected device 200 has not been secured (i.e., the detected device 200 has yet to be registered), the data area creating subunit 241 determines the need for a new registration and creates a data area in the registry management information holding unit 25. On the other hand, if a data area for the detected device 200 has already been secured (i.e., the detected device 200 has already been registered), the data area creating subunit 241 determines the need for data update and specifies the data area.

The cross-checking subunit 242 refers to the input information group 22D to cross-check the information items of the input information group 22D with those of the device information of the detected device 200. In the cross-checking process, the cross-checking subunit 242 checks whether, in the input information group 22D, there is an information item in common with the device information (i.e., an information item used to connect a piece of input information to the device information). If a common information item, the cross-checking subunit 242 determines that the information connection can be established and acquires, from the input information group 22D, a piece of input information whose item entry of the common information item matches that of the device information. The cross-checking subunit 242 passes the acquired information piece (input information to be connected) and the device information to the registration and update subunit 243 and makes a registration or update request with the registration and update subunit 243. On the other hand, if there is no common information item, the cross-checking subunit 242 determines that the information connection cannot be established and gives notice accordingly (i.e., performs a predetermined information notice process).

The registration and update subunit 243 connects the received input information to the device information, and stores the connected information in the registry management information holding unit 25 as the latest registry management information group 25D to thereby carry out data registration or update. In the case of a new registration, the registration and update subunit 243 stores the connected information in a new data area created by the data area creating subunit 241. In the case of data update, the registration and update subunit 243 writes the connected information to overwrite information in an existing data area specified by the data area creating subunit 241.

Thus, in cooperation with the device searching and device information acquiring unit 23, the information registration and update control unit 24 dynamically connects appropriate input information, which is acquired from the input information group 22D, to device information of a device 200 at the time of the installation of the device 200.

The information update receiving unit 26 is a functional unit for receiving notice of updating device information. The information update receiving unit 26 receives the latest device information transmitted from a device 200 using the above-mentioned Trap command or the like. The received device information is passed from the information update receiving unit 26 to the information registration and update control unit 24, and then, in the registry management information group 25D, the content of registry management information corresponding to the received device information is updated.

As has been described above, the information management function according to the present embodiment is achieved through cooperation among the above-mentioned respective functional units.

Next are described detailed operations of the information management function (cooperation among the functional units) according to the present embodiment with reference to a sequence diagram showing process procedures.

The information management function is achieved when a program (a software component for achieving the information management function) installed in the device management apparatus 100 is loaded by the CPU 106 into the RAM 104 from a storage location (for example, the HDD 108) and the following process is executed.

Figure 7:
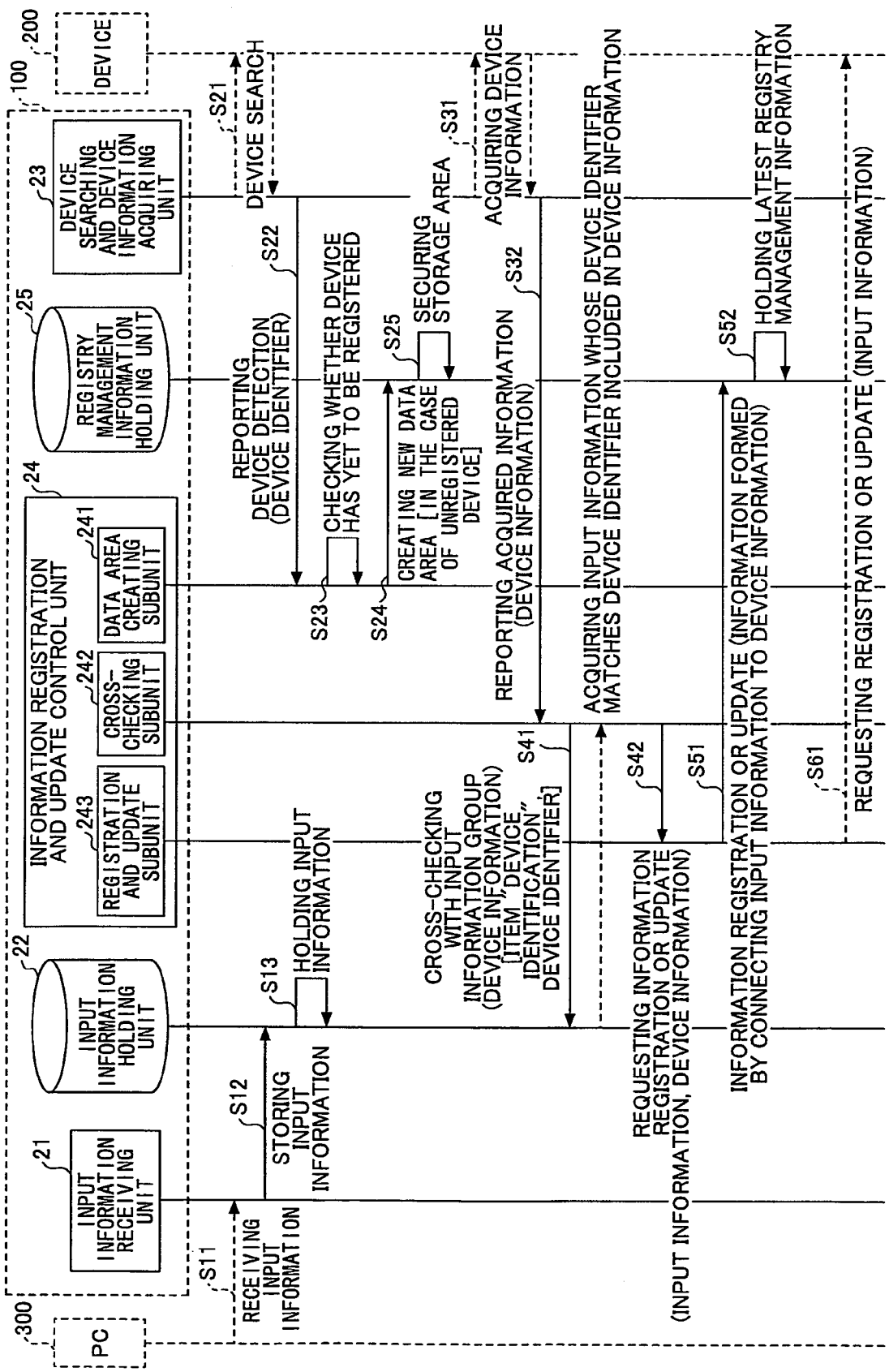
FIG. 7 is a sequence diagram showing an example of process procedures for performing information registration by connecting appropriate input information to device information of a device at the time of installation of the device according to the first embodiment of the present invention.

FIG. 7 is a sequence diagram showing an example of process procedures for performing information registration by connecting appropriate input information, which is acquired from the input information group 22D, to device information of a device 200 at the time of the installation of the device 200 according to the present embodiment. FIG. 8 shows an example of data transition in the registry management information group 25D made by the process illustrated in FIG. 7.

As shown in FIG. 7, the input information receiving unit 21 of the device management apparatus 100 receives the input information group 22D from a PC 300 (Step S11), and then stores the received input information group 22D in the input information holding unit 22 (Step S12), which holds the input information group 22D (Step S13).

In this condition, the device searching and device information acquiring unit 23 performs a device search to detect one or more devices 200 (Step S21). At this point, the device searching and device information acquiring unit 23 acquires, as detection information, a device identifier from each of detected devices 200.

The device searching and device information acquiring unit 23 of the device management apparatus 100 reports the device detections to the data area creating subunit 241 of the information registration and update control unit 24 (Step S22). At this point, the device searching and device information acquiring unit 23 passes the detection information (device identifier) of each of the detected devices 200 to the data area creating subunit 241.

The data area creating subunit 241 of the device management apparatus 100 checks whether each of the detected devices 200 has yet to be registered (Step S23). The data area creating subunit 241 makes an access to the registry management information holding unit 25 based on the detection information (device identifier) received from the device searching and device information acquiring unit 23, and determines whether the detected device 200 has already been registered according to the presence or absence of registry management information corresponding to the device 200. If the detected device 200 has yet to be registered, the data area creating subunit 241 creates a new data area in the registry management information holding unit 25 (Step S24), which then secures a storage area for the registry management information corresponding to the detected device 200 (Step S25). On the other hand, if the detected device 200 has already been registered, the data area creating subunit 241 specifies, in the registry management information holding unit 25, a storage area in which the registry management information corresponding to the device 200 is stored.

(A) of FIG. 8 shows an example of a data area (storage area of registry management information) RN secured in the registry management information holding unit 25 in Step S25 in the case when a detected device 200 having a device identifier of "222.333.12.2" has yet to be registered. At this point, the registry management information in the data area RN has no item entries (Null) under the information items as shown in (A) of FIG. 8, and simply the storage area has been secured for the registry management information corresponding to the device 200.

Referring back to FIG. 7, the device searching and device information acquiring unit 23 of the device management apparatus 100 acquires device information from each detected device 200 (Step S31). The device searching and device information acquiring unit 23 reports the information acquisition to the cross-checking subunit 242 of the information registration and update control unit 24 (Step S32). At this point, the device searching and device information acquiring unit 23 passes the device information to the cross-checking subunit 242.

The cross-checking subunit 242 of the device management apparatus 100 makes an access to the input information holding unit 22 and cross-checks respective information items of the input information group 22D with those of the received device information (Step S41). Assume here that, in the cross-checking process, the cross-checking subunit 242 determines that, in the input information group 22D, there is an information item in common with the device information, which information item is "device identification". The cross-checking subunit 242 acquires, from the input information group 22D, a piece of input information whose item entry (device identifier) of the common information item matches that of the device information.

The cross-checking process is described with a specific example where the device identifier of the detected device 200 is "222.333.12.2", the input information group 22D is one shown in FIG. 4 and the device information is the second piece appearing in the device information group of FIG. 5. The cross-checking subunit 242 cross-checks the device information with the input information group 22D and determines that the item "device identification" is a common information item. Subsequently, the cross-checking subunit 242 refers to item entries under the item "device identification" of the input information group 22D based on the device identifier "222.333.12.2", and acquires a piece of input information whose item entry under the item "device identification" is "222.333.12.2".

The cross-checking subunit 242 passes the acquired input information (information to be connected) and the device information to the registration and update subunit 243 of the information registration and update control unit 24, and makes a registration or update request with the registration and update subunit 243 (Step S42). On the other hand, if there is no common information item, the cross-checking subunit 242 gives notice that the information connection cannot be established.

The registration and update subunit 243 of the device management apparatus 100 makes an access to the registry management information holding unit 25 and stores information formed by connecting the input information and the device information in the secured (or specified) storage area to thereby carry out data registration or update (Step S51). As a result, the registry management information holding unit 25 holds the latest registry management information in the registry management information group 25D (Step S52).

(B) of FIG. 8 shows an example of the data area RN in which the latest registry management information is stored in the process of Step S51. As shown in (B) of FIG. 8, the registry management information at this point has actual entries (actual data) under the information items, which were previously blank ("Null"). Note that the example shown in (B) of FIG. 8 is for when the device identifier of the detected device 200 is "222.333.12.2", and the actual entries in (B) of FIG. 8 are item entries of the second device information in the device information group of FIG. 5 and item entries of the input information acquired from the input information group 22D of FIG. 4 based on the common information item "device identification" and the device identifier.

Referring back to FIG. 7, the registration and update subunit 243 of the device management apparatus 100 may transmit the input information to the detected device 200 via the network in synchronization with the above process in Step S51, and make a registration or update request with the detected device 200 (Step S61). Herewith, the device 200 holds the input information which has been connected to its own device information by the device management apparatus 100.

According to the process procedures as described above, the device management apparatus 100 of the present embodiment achieves the operation of information registration in which appropriate input information is dynamically connected to device information of a device 200 at the time of the installation of the device 200.

Modification

FIG. 9 is a diagram showing a second data example of the input information group 22D according to a modification of the present embodiment. The above embodiment describes an example of operations in which the item entry of the information used for connecting the input information and the device information is a network setting value under the item "device identification" which can be acquired from the detected device 200. However, it is sometimes the case that a network setting value is changed. For example, in the case where a network setting value is an IP address, the IP address may be changed via an operations panel (not shown) of the device 200 or when the installation site of the device 200 is changed. In the case where a network setting value is a MAC address, the MAC address may be changed when the interface unit 107 of the device 200 is replaced.

In such a case, there are concerns that the registration and update subunit 243 establishes incorrect information connection between device information and input information and registers or updates the incorrect information connection as the registry management information.

Given this factor, the present modification is configured such that, in the case when a network setting value is used as an item entry, the network setting value is combined with one or more different types of network setting values. That is, the cross-checking subunit 242 acquires input information from the input information group 22D only when the combined network setting values of the input information all match network setting values included in the device information of the detected device 200.

Herewith, even if a network setting value used as an item entry of the common information item between device information and input information is changed, the device management apparatus 100 is capable of preventing incorrectly connected information from being registered or updated.

Conclusion

As has been described above, in the device management apparatus 100 according to the present embodiment, the input information receiving unit 21 receives, prior to device installation, an input of one or more pieces of information, each piece of which is to be connected to device information of a different installed device 200, and stores the received information in a predetermined storage area (the input information holding unit 22) as the input information group 22D. In this condition, the device searching and device information acquiring unit 23 of the device management apparatus 100 detects one or more devices 200 and acquires the device information from each of the detected devices 200. Subsequently, the information registration and update control unit 24 of the device management apparatus 100 performs the following process.

The information registration and update control unit 24 refers to the input information group 22D to cross-check information items of the input information group 22D with those of device information of each detected device 200, and determines whether, in the input information group 22D, there is an information item in common with the device information. If there is a common information item, the information registration and update control unit 24 determines that the information connection can be established and acquires, from the input information group 22D, a piece of input information whose item entry of the common information item matches that of the device information. The information registration and update control unit 24 then connects the acquired information to the device information, and stores the connected information in a predetermined storage area (the registry management information holding unit 25) as the registry management information to thereby carry out data registration or update.

Herewith, the device management apparatus 100 according to the present embodiment is able to dynamically connect the information input preliminarily to the device information of the device 200 at the time of the installation. As a result, it is possible to relieve the administrator from the workload of performing such information connection.

[Second Embodiment]

The second embodiment of the present invention describes a device management system for connecting input information to device information by making an access to a database (i.e., a memory device; hereinafter referred to simply as a "DB") connected on the network.

Since information to be connected to device information is arbitrarily determined by the user, the information does not necessarily include an information item common to that of the device information. In addition, since the device information is acquired from a device 200, information items included in the device information are limited.

For example, even if the user decides to use the information items "administrator" and "asset management" for information connection, the information connection cannot be established because these information items are not included in the device information.

Given this factor, the device management apparatus 100 according to the present embodiment has an information management function for, when there is no common information item between the device information acquired from each device 200 and the input information group 22D received from the user, referring to an information source of an accessible DB and connecting appropriate input information acquired from the input information group 22D to the device information using an information item of the information source.

The following describes the information management function according to the present embodiment. Note that the same reference numerals are given to the components which are common to those in the first embodiment, and their explanations are omitted here while only a difference from the first embodiment is explained.

System Configuration

Figure 10:
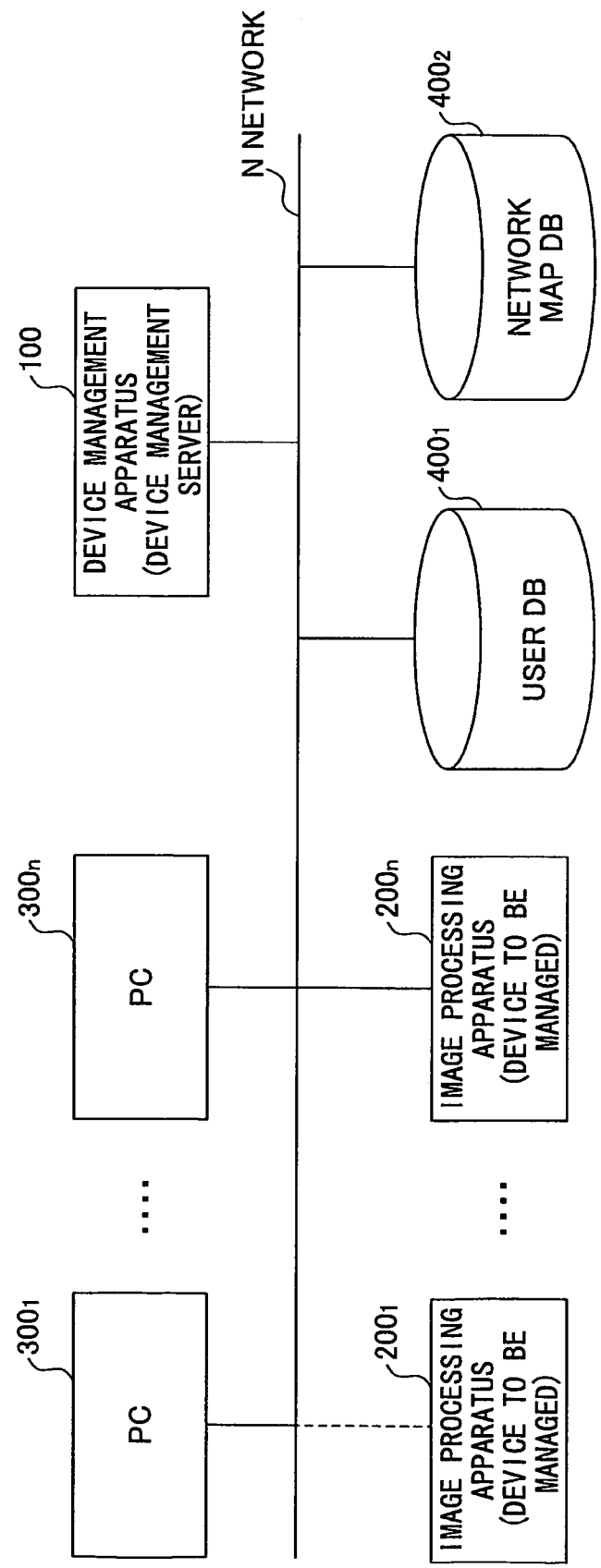
FIG. 10 shows a configuration example of a device management system according to a second embodiment of the present invention.

FIG. 10 shows a configuration example of the device management system 1 according to the present embodiment. In the system configuration example of FIG. 10, in addition to the device management apparatus 100, the devices 200 and the PCs 300, a user DB $400_1$ and a network map DB $400_2$ are connected via the same network.

The user DB $400_1$ is where various types of management information used for user management are registered. The network map DB $400_2$ is where various types of management information for managing network settings allocated to the devices 200, the PCs 300 and the like are registered.

FIGS. 11A and 11B show examples of data included in the DBs $400_1$ and $400_2$, respectively, according to the present embodiment. FIG. 11A shows an example of data (a management information group $400D_1$) included in the user DB $400_1$ where various information items, such as a user identification, a division name and asset management, are associated with each other. The item "user identification" is for registering user identification information. The item "division name" is for registering organizational affiliation information of a registered user. Item entries of this item include a division name and a division ID. The item "asset management" is for registering asset management information managed by a registered user in the case when the registered user is an administrator.

The management information group $400D_1$ of the user DB $400_1$ is made up of one or more pieces of management information, each piece of which is one data set where the aforementioned information items are associated with each other. The number of the information pieces corresponds to that of the registered users.

Thus, with the above-mentioned data structure of the user DB $400_1$, it is possible to specify one piece out of the one or more pieces of registered management information based on a piece of user identification information.

FIG. 11B shows an example of data (a management information group $400D_2$) included in the network map DB $400_2$ where various information items, such as a location, a division name and a segment, are associated with each other. The item "location" is for registering location information of each device 200, each PC 300 and the like. The item "segment" is for registering segment information of an IP address allocated to each device 200, each PC 300 and the like. Item entries of this item include a setting range (network map) of a corresponding IP address.

The management information group $400D_2$ of the network map DB $400_2$ is made up of one or more pieces of management information, each piece of which is one data set where the aforementioned information items are associated with each other. The number of the information pieces corresponds to that of the registered segments.

Thus, with the above-mentioned data structure of the network map DB $400_2$, it is possible to specify one piece out of the one or more pieces of registered management information based on a piece of segment information.

As has been described above, with the aforementioned system configuration, the device management system 1 is capable of providing information management service using the DBs $400_1$ and $400_2$. Note that, in the following description, the user DB $400_1$ and the network map DB $400_2$ are referred to collectively and simply as "DBs 400" when they need not be distinguished.

Information Management Function

Figure 12:
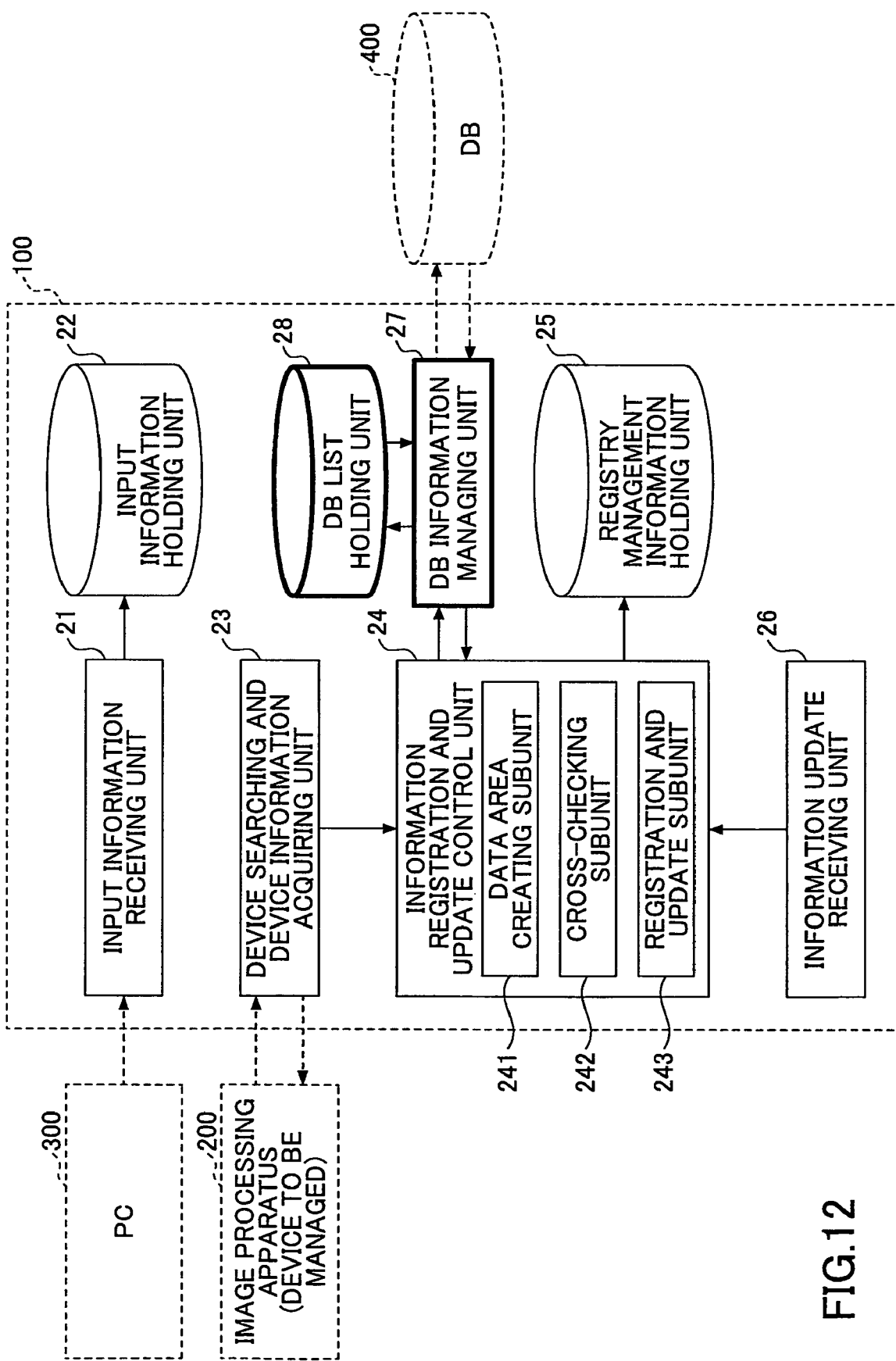
FIG. 12 shows a functional configuration example of a device management apparatus according to the second embodiment of the present invention.

FIG. 12 shows a functional configuration example of the device management apparatus 100 according to the present embodiment. As shown in FIG. 12, the present embodiment differs from the first embodiment in that the device management apparatus 100 includes a DB information managing unit 27.

The DB information managing unit 27 is a functional unit for managing information regarding the DBs 400 (hereinafter referred to as "DB information") accessible via the network. The DB information managing unit 27, for example, provides a predetermined input screen having a GUI and receives one or more pieces of DB information as shown in FIG. 13. The DB information managing unit 27 makes a list of the received DB information and stores the list in a DB list holding unit 28. The DB information holding unit 28 is, for example, a predetermined storage area in a storage device (for example, the HDD 108) of the device management apparatus 100.

FIG. 13 shows a data example of a DB list 28D according to the present embodiment. FIG. 13 illustrates an example of data in which information items, such as registration contents and DB identification, are associated with each other. The item "registration contents" indicates various information items registered in an associated DB 400. Item entries of this item include names of the information items. The item "DB identification" indicates identification information of each DB 400 (DB identification information). Item entries of this item include a DB name, a DB ID and an IP address and link information allocated to the DB 400.

The DB list 28D is made up of one or more pieces of management information, each piece of which is one data set where the aforementioned information items are associated with each other. The number of the information pieces corresponds to that of the DBs 400.

Thus, with the above-mentioned data structure of the DB list 28D, it is possible to specify, in the one or more pieces of registered DB information, one piece corresponding to a particular DB 400 based on a piece of DB identification information.

Note that, in the above description, the DB information is registered as a list using the input screen; however, the method of registering the DB information is not limited to this case. For example, the following method may be used instead. That is, DBs 400 connected to the network are searched for by broadcast communication or the like. Based on the search result (network response result), information regarding registered information items is acquired from each DB 400, and then the DB list 28D is dynamically created from the acquired information.

The DB information managing unit 27 makes an access to the DB list holding unit 28, performs data manipulation according to a request from the information registration and update control unit 24, and transmits the manipulation result to the information registration and update control unit 24.

Figure 14:
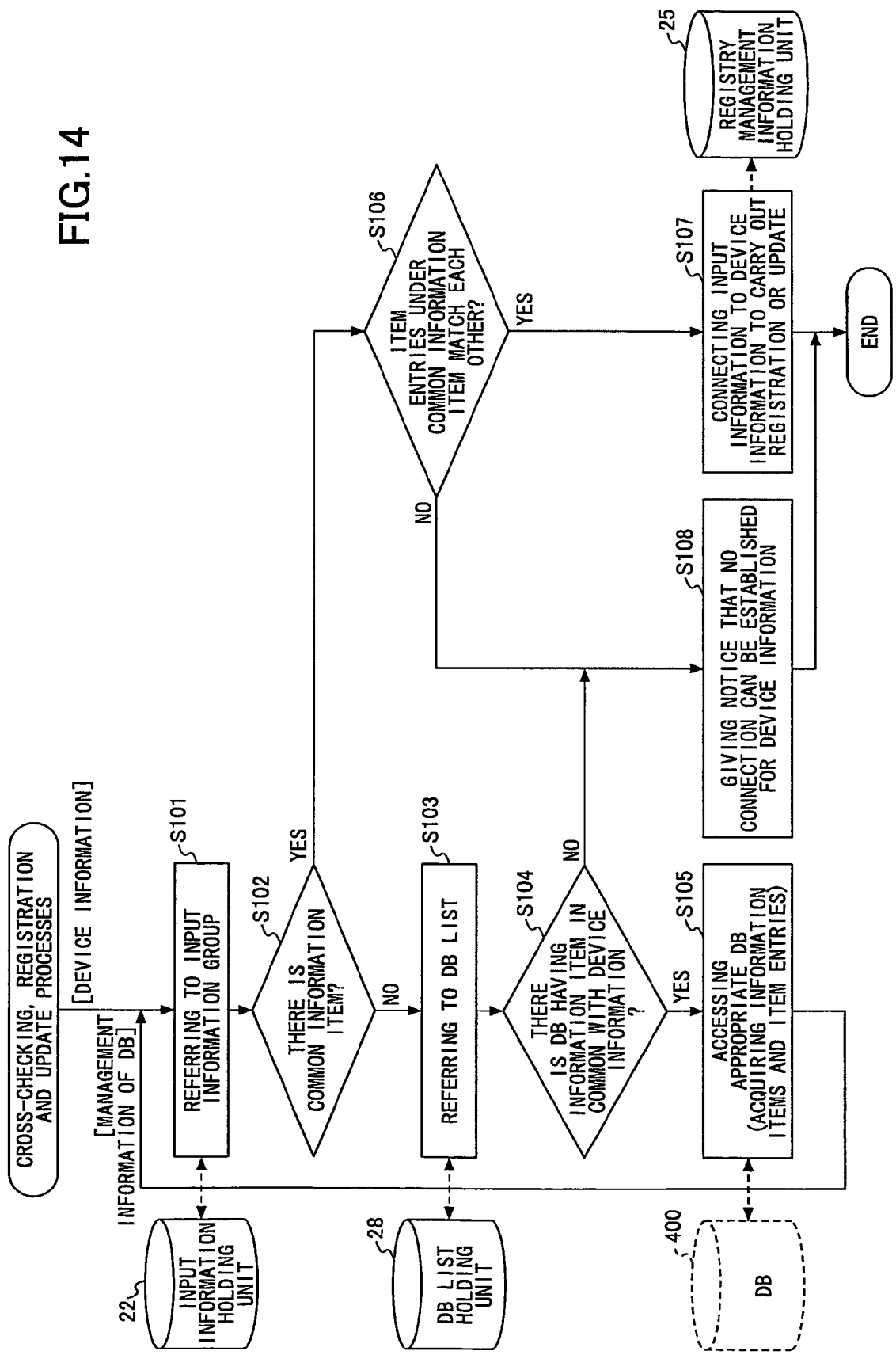
FIG. 14 is a flowchart showing an example of process procedures of information cross-checking, registration and update according to the second embodiment of the present invention.

Next is described a cooperation process of the DB information managing unit 27 and other functional units. FIG. 14 is a flowchart showing an example of process procedures of information cross-checking, registration and update according to the present embodiment. FIG. 14 mainly shows details of processes performed by the information registration and update control unit 24 (Steps S41, S42, S51 and S52) shown in FIG. 7.

As shown in FIG. 14, the cross-checking subunit 242 makes an access to the input information holding unit 22 and refers to the input information group 22D (Step S101).

The cross-checking subunit 242 determines whether, in the input information group 22D, there is an information item in common with the device information in question (Step S102).

If there is a common information item (Step S102: YES), the cross-checking subunit 242 further determines whether, under the common information item in the input information group 22D, an item entry matches that of the device information (Step S106).

If a piece of input information whose item entry of the common information item matches that of the device information (Step S106: YES), the cross-checking subunit 242 acquires the piece of input information from the input information group 22D, and then passes the acquired input information and the device information to the registration and update subunit 243. In response, the registration and update subunit 243 makes an access to the registry management information holding unit 25, and stores information formed by connecting the acquired input information to the device information in the registry management information holding unit 25 to thereby carry out data registration or update (Step S107). On the other hand, no piece of input information whose item entry of the common information item matches that of the device information (Step S106: NO), the cross-checking subunit 242 gives notice that no connection can be established for the device information (Step S108).

If there is no common information item (Step S102: NO), the cross-checking subunit 242 makes a request with the DB information managing unit 27 to check whether there is a DB 400 having an information item in common with the device information. Subsequently, the DB information managing unit 27 makes an access to the DB list holding unit 28 and refers to the DB list 28D based on information items of the device information (Step S103).

The DB information managing unit 27 determines whether, in the DB list 28D, there is a DB 400 having an information item in common with the device information (Step S104). That is, the DB information managing unit 27 makes an access to the DB list holding unit 28 and specifies, based on the information items of the device information, a DB 400 having a common information item in the DB list 28D.

If there is a DB 400 having an information item in common with the device information (Step S104: YES), the DB information managing unit 27 transmits DB identification information of the appropriate DB 400 as the check result to the cross-checking subunit 242 having made the check request. In response, the cross-checking subunit 242 makes an access to the DB 400 based on the transmitted DB identification information and acquires the management information (information items and item entries) of the DB 400 (Step S105). On the other hand, if there is no DB 400 having an information item in common with the device information (Step S104: NO), the cross-checking subunit 242 gives notice that no connection can be established for the device information (Step S108).

After acquiring the management information from the DB 400 in Step S105, the cross-checking subunit 242 moves again to Step S101 and refers to the input information group 22D. From here on, the cross-checking subunit 242 repeats the above-described processes of Steps S102 to S106 using the management information of the DB 400 and the input information group 22D until the process of Step S107 or S108 is carried out.

That is, the following processes are carried out. The cross-checking subunit 242 refers again to the input information group 22D and checks whether, in the input information group 22D, there is an information item in common with the management information of the DB 400. If there is a common information item, the cross-checking subunit 242 acquires, from the input information group 22D, a piece of input information whose item entry of the common information item matches that of the management information, and then passes the acquired input information and the device information to the registration and update subunit 243. In response, the registration and update subunit 243 stores information formed by connecting the acquired input information and the device information in the registry management information holding unit 25 to thereby carry out data registration or update. On the other hand, if there is no common information item in the input information group 22D or if there is no piece of input information whose item entry of the common information item matches that of the management information, the cross-checking subunit 242 gives notice that no connection can be established for the device information.

Next are described two specific examples regarding various types of data manipulation performed when the above processes are carried out.

EXAMPLE 1

Figure 15:
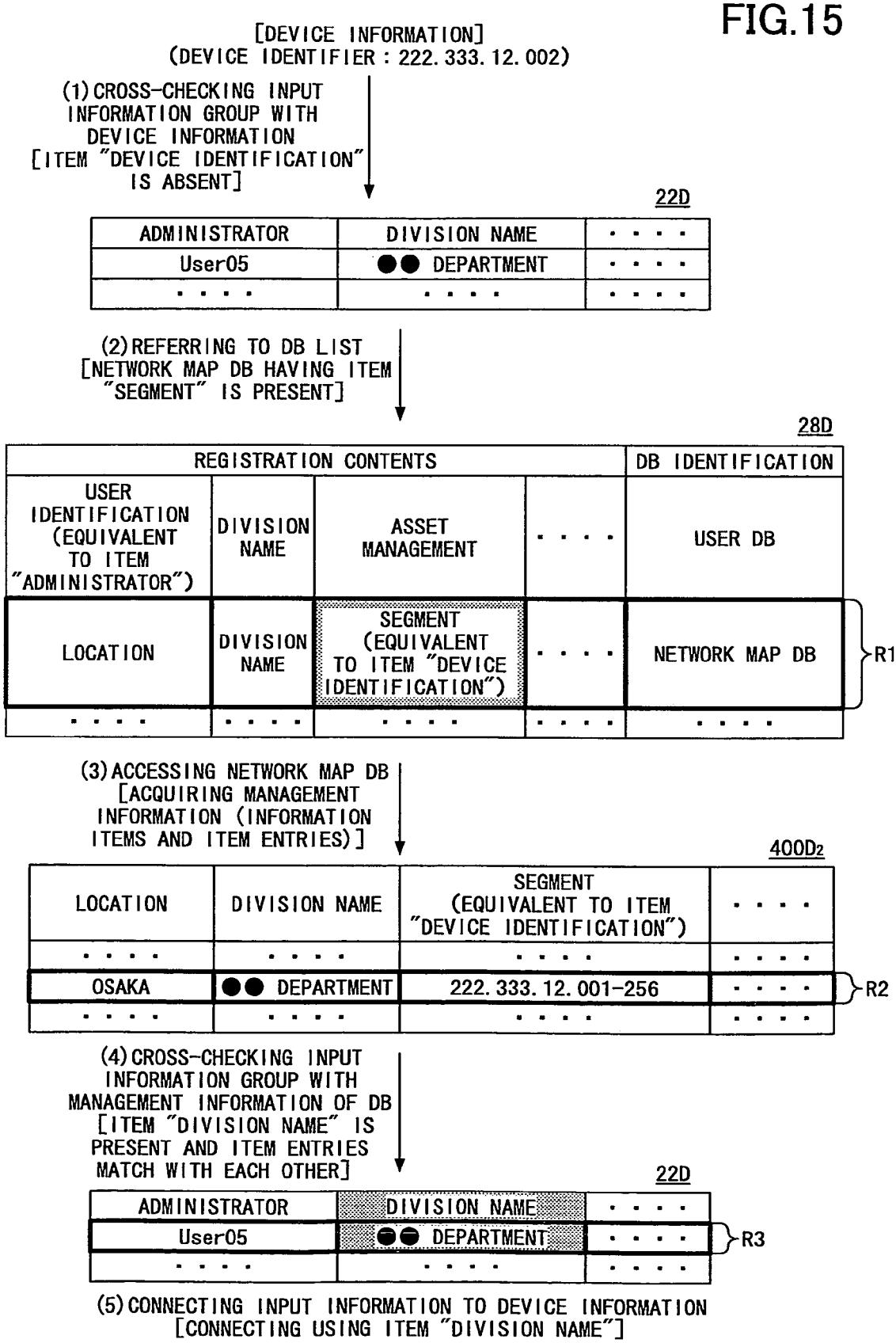
FIG. 15 is a diagram showing a first example of a data reference operation implemented at the time of information cross-checking according to the second embodiment of the present invention.

FIG. 15 is a diagram showing a first example of the data reference operation implemented at the time of information cross-checking according to the present embodiment. FIG. 15 illustrates an example of the operation implemented when the device identifier "222.333.12.2" is acquired from a detected device 200 as the device information and the input information group 22D including the items "administrator" and "division name" is held.

(1) Cross-Checking the Input Information Group 22D with the Device Information The cross-checking subunit 242 cross-checks the input information group 22D with the device information. The cross-checking subunit 242 determines in Step S102 of FIG. 14 that the item "device identification" (a common information item) is not present in the input information group 22D.

(2) Referring to the DB List 28D

In response to the cross-checking result from the cross-checking subunit 242, the DB information managing unit 27 refers to the DB list 28D using the item "device identification" as a reference key. In Step S104 of FIG. 14, the cross-checking subunit 242 determines the presence of the network map DB 400₂ having the item "segment", which is an information item equivalent to the item "device identification". That is, the DB information managing unit 27 specifies a DB 400 having an information item in common with the device information, and acquires an appropriate information piece (the reference symbol R1 of FIG. 15) from the DB list 28D.

(3) Accessing the Network Map DB 400₂

In response to the check result from the DB information managing unit 27, the cross-checking subunit 242 makes an access to the network map DB 400₂ (appropriate DB) in Step S105 of FIG. 14. The cross-checking subunit 242 acquires, from the management information group 400D₂, a management information piece including the items "location" and "division name" associated with the item "segment" having an appropriate device identification (the reference symbol R2 of FIG. 15). That is, the cross-checking subunit 242 refers to the management information of an appropriate DB 400 and specifies a candidate information item to be used for cross-checking with the input information group 22D.

(4) Cross-Checking the Input Information Group 22D with the Management Information of the DB 400₂

The cross-checking subunit 242 cross-checks the input information group 22D with the management information of the network map DB 400₂. In Step S102 of FIG. 14, the cross-checking subunit 242 determines the presence of the item "division name" (a common information item) in the input information group 22D.

(5) Connecting Input Information to the Device Information

In response to the cross-checking result of the information item, the cross-checking subunit 242 determines in Step S106 of FIG. 14 that in the input information group 22D, there is a piece of input information whose item entry under the common information item "division name" matches that of the management information of the network map DB 400₂. In response to the cross-checking result from the cross-checking subunit 242, the registration and update subunit 243 acquires in Step S107 of FIG. 14, from the input information group 22D, a piece of input information including the item "administrator" associated with the item "division name" (the reference symbol R3 of FIG. 15). Subsequently, in Step S107 of FIG. 14, the registration and update subunit 243 connects the input information (R3) to the device information based on the item "division name" of the network map DB 400₂.

FIG. 16 is a diagram showing a first example of data transition of the registry management information group 25D according to the present embodiment.

(6) Registering or Updating the Registry Management Information Group 25D

In Step S107 of FIG. 14, the registration and update subunit 243 stores item entries in the items "administrator", "location" and "division name", which are blank ("Null") at the time when the data area is created. Subsequently, the registration and update subunit 243 carries out data registration or update on an information piece of registry management information corresponding to the detected device 200 (the reference symbol RN of FIG. 16). Note that the item entries of the items "administrator" and "division name" are from those of the input information connected to the device information, and that the item entry of the item "location" is from that of the management information (obtained from the management information group $400D_2$ of the network map DB $400_2$) having the common information item, the item "division name", with the device information.

EXAMPLE 2

Figure 17:
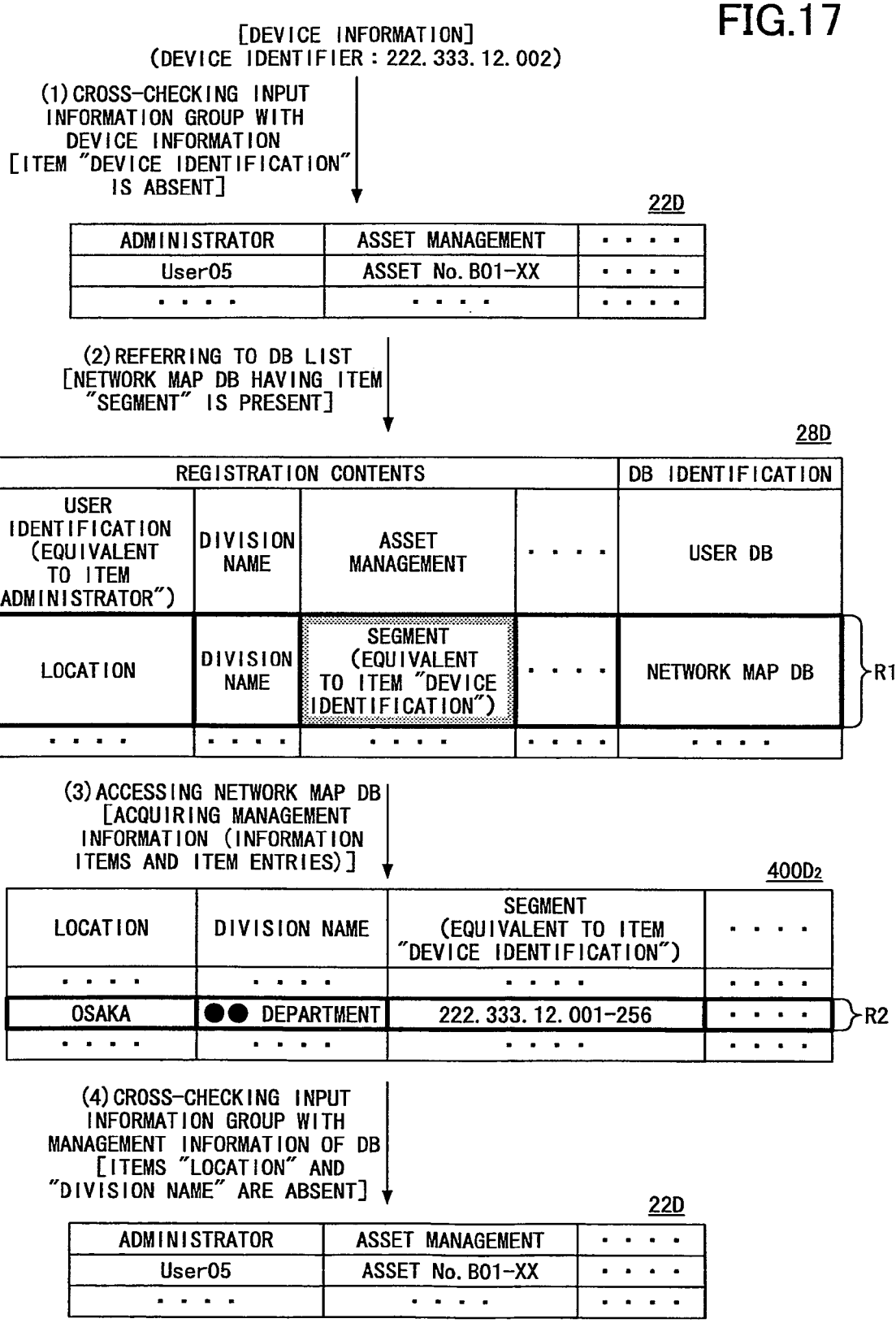
FIG. 17 is a diagram showing a second example of the data reference operation implemented at the time of information cross-checking according to the second embodiment of the present invention.

FIGS. 17 and 18 are diagrams showing second and third examples, respectively, of the data reference operation implemented at the time of information cross-checking according to the present embodiment. FIG. 17 illustrates an example of the operation implemented when the device identifier "222.333.12.2" is acquired from a detected device 200 as the device information and the input information group 22D including the items "administrator" and "asset management" is held. Note that since the data manipulation procedures (1) to (3) of FIG. 17 are the same as those of FIG. 15, their explanations are omitted here, and the following explanation is given of the data manipulation procedure of (4) and from then on.
(4) Cross-Checking the Input Information Group 22D with the Management Information of the DB $400_2$ The cross-checking subunit 242 cross-checks the input information group 22D with the management information of the network map DB $400_2$. In Step S102 of FIG. 14, the cross-checking subunit 242 determines the absence of the items "location" and "division name" in the input information group 22D.
(5) Referring to the DB List 28D

In response to the cross-checking result from the cross-checking subunit 242, the DB information managing unit 27 refers to the DB list 28D using the items "location" and "division name" as reference keys. In Step S104 of FIG. 14, the DB information managing unit 27 determines the presence of the user DB $400_1$ having the item "division name" in the DB information, except for the network map DB $400_2$. That is, the DB information managing unit 27 specifies a DB 400 having the same information item, which DB 400 is not the DB 400 having been accessed in the procedure (3), and acquires an appropriate information piece (the reference symbol R3 of FIG. 18) from the DB list 28D.
(6) Accessing the User DB $400_1$ In response to the check result from the DB information managing unit 27, the cross-checking subunit 242 makes an access to the user DB $400_1$ in Step S105 of FIG. 14. The cross-checking subunit 242 acquires, from the management information group DB $400D_1$, a management information piece including the items "user identification" and "asset management" associated with the item "division name" (the reference symbol R4 of FIG. 18). That is, the cross-checking subunit 242 refers to the management information of an appropriate DB 400 and specifies a candidate information item (an information item which is not specified in the procedure (3)) to be used for cross-checking with the input information group 22D.
(7) Cross-Checking the Input Information Group 22D with the Management Information of the DB $400_1$ The cross-checking subunit 242 cross-checks the input information group 22D with the management information of the user DB $400_1$. In Step S102 of FIG. 14, the cross-checking subunit 242 determines the presence of the item "administrator", which is an information item equivalent to the item "user identification", in the input information group 22D.
(8) Connecting Input Information to the Device Information In response to the cross-checking result of the information item, the cross-checking subunit 242 determines in Step S106 of FIG. 14 that in the input information group 22D, there is a piece of input information whose item entry of the information item "administrator" matches the item entry of the equivalent information item "user identification" in the management information of the user DB $400_1$. In response to the cross-checking result from the cross-checking subunit 242, the registration and update subunit 243 acquires in Step S107 of FIG. 14, from the input information group 22D, a piece of input information including the item "asset management" associated with the item "administrator" (the reference symbol R5 of FIG. 18). Subsequently, in Step S107 of FIG. 14, the registration and update subunit 243 connects the input information (R5) to the device information based on the item "user identification" of the user DB $400_1$.

FIG. 19 is a diagram showing a second example of the data transition of the registry management information group 25D according to the present embodiment.
(9) Registering or Updating the Registry Management Information Group 25D

In Step S107 of FIG. 14, the registration and update subunit 243 stores item entries in the items "administrator", "division name" and "asset management", which are blank ("Null") at the time when the data area is created. Subsequently, the registration and update subunit 243 carries out data registration or update on an information piece of registry management information corresponding to the detected device 200 (the reference symbol RN of FIG. 19). Note that the item entries of the items "administrator" and "asset management" are from those of the input information connected to the device information, and that the item entry of the item "division name" is from that of the management information (obtained from the management information group $400D_1$ of the user DB $400_1$) having the item "user identification", which is equivalent to the item "administrator" of the device information.

As has been described above, even if the information group 22D does not have an information item in common with the device information in question, the device management apparatus 100 of the present embodiment is capable of, through the cooperation of the DB information managing unit 27 and the information registration and update control unit 24, achieving the information management function for referring to the information source of an accessible DB 400 and dynamically connecting appropriate input information acquired from the input information group 22D to the device information using an information item of the information source in common with the device information.

In addition, according to the present embodiment, the following process may be performed in the case when the information registration and update control unit 24 updates the registry management information group 25D based on the input information 22D.

Figure 20:
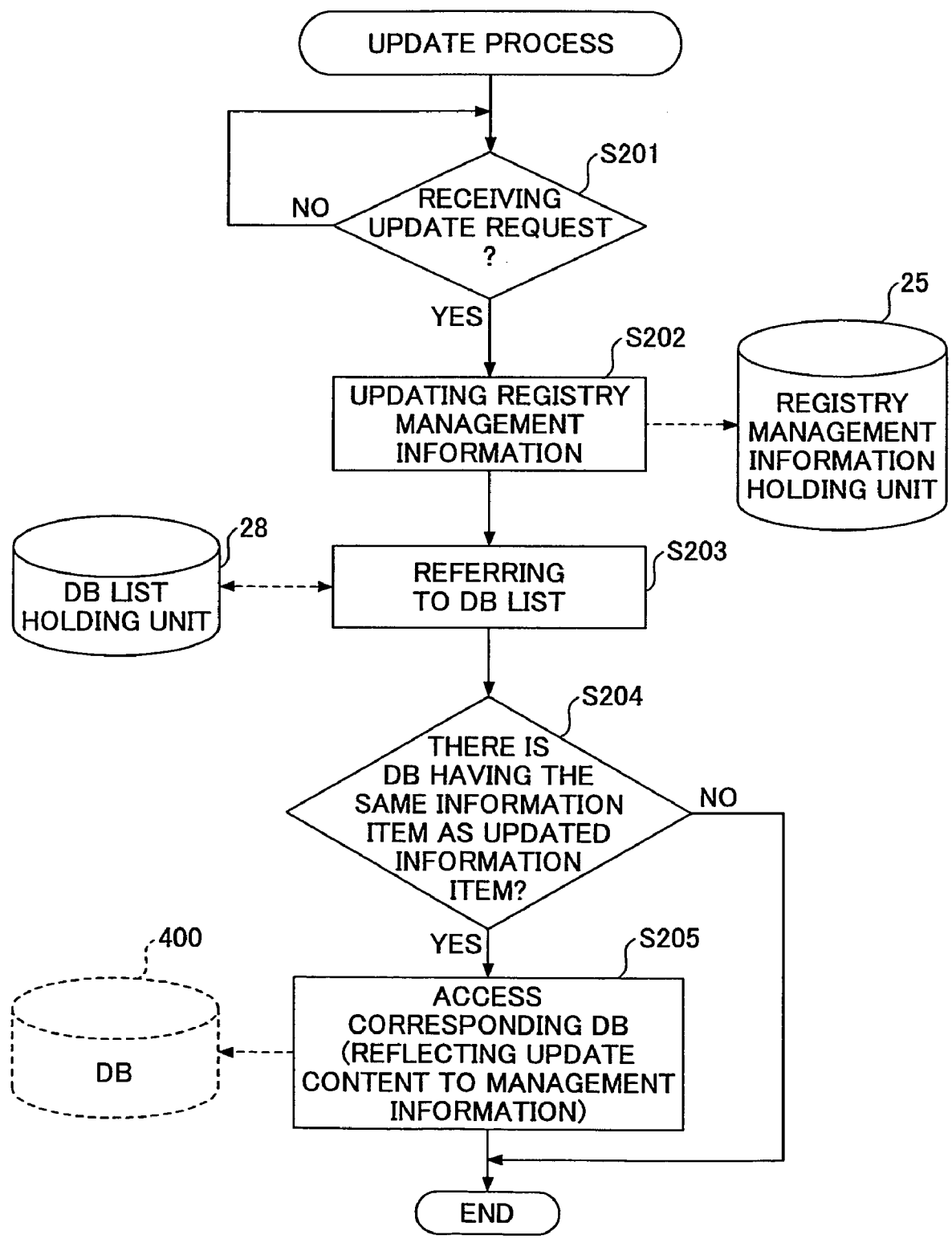
FIG. 20 is a flowchart showing an example of process procedures of information update according to the second embodiment of the present invention.

FIG. 20 is a flowchart showing an example of process procedures of information update according to the present embodiment. As shown in FIG. 20, when the information registration and update control unit 24 receives a request for updating the registry management information group 25D (Step S201: YES), the registration and update subunit 243 makes an access to the registry management information holding unit 25 and writes an update entry received at the time of the request over the item entry under an appropriate information item to thereby carry out data update of the registry management information group 25D (Step S202). When completing the update of the registry management information group 25D, the registration and update subunit 243 makes a request with the DB information managing unit 27 to check whether there is a DB 400 having the same information item as the updated information item. In response, the DB information managing unit 27 makes an access to the DB list holding unit 28 and refers to the DB list 28D based on the updated information item (Step S203).

The DB information managing unit 27 determines whether, in the DB list 28D, there is a DB 400 having the same information item as the updated information item (Step S204).

If there is a DB 400 having the same information item as the updated information item (Step S204: YES), the DB information managing unit 27 transmits the DB identification information of a corresponding DB 400 as the check result to the registration and update subunit 243 having made the check request. In response, the registration and update subunit 243 makes an access to the DB 400 and reflects the update content to the management information based on the transmitted DB identification information (Step S205).

Thus, the device management apparatus 100 according to the present embodiment is capable of updating the management information of a DB 400 having the same information item as an updated information item in synchronization with the update of the registry management information group 25D.

Modification

Next is described a modification of the present embodiment. As described above in relation to Steps S102 and S106 of FIG. 14, if there is a common information item when the cross-checking subunit 242 cross-checks the input information group 22D with the device information or the management information of the DB 400, the cross-checking subunit 242 determines whether, under the common information item in the input information group 22D, an item entry matches that of the device information or the management information. In this situation, the cross-checking subunit 242 may find multiple information items whose item entries need to be brought to the match determination (i.e., there are multiple common information items).

Given this factor, according to the present modification, in the case when there are multiple common information items, the order for checking the match between item entries of the common information items is decided based on information as shown in FIG. 21.

FIG. 21 is a diagram showing a data example of checking order decision information 31D according to the present modification. FIG. 21 illustrates an example of data in which the checking order is associated with information items. Under the item "checking order", information indicating the order for checking the match between item entries of common information items (checking order information) is entered. Item entries of this item include a numerical number. Under the item "item name", identification information of an information item (item identification information) is entered. Item entries of this item include a name of an information item.

The item entries of the item "checking order" are decided according to the degree of uniqueness of the information, that is, the less likelihood of information change. More specifically, an information item less likely to be changed (a high degree of uniqueness) has a higher likelihood of being matched, and is therefore placed high in the checking order.

The checking order decision information 31D is made up of multiple pieces of information, each piece of which is a data set where the aforementioned information items are associated with each other. The number of the information pieces corresponds to that of the information items. The information registration and update control unit 24 has the checking order decision information 31D.

Thus, with the above-mentioned data structure of the checking order decision information 31D, an information item used for checking the match between item entries can be decided based on the checking order information.

The following describes information cross-checking, registration and update processes in which the checking order decision information 31D is used.

Figure 22:
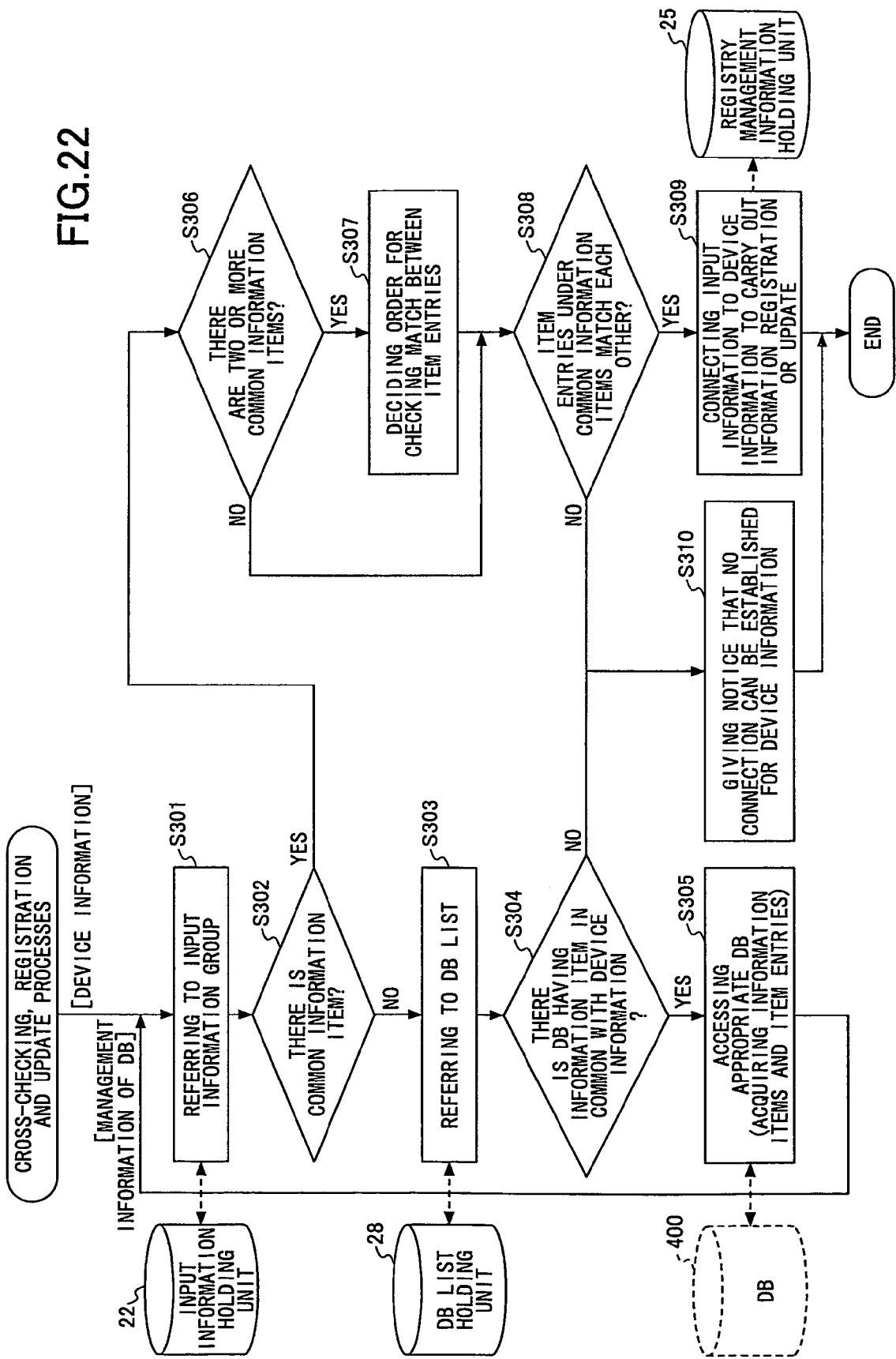
FIG. 22 is a flowchart showing an example of process procedures for information cross-checking, registration and update according to the modification of the present invention.

FIG. 22 is a flowchart showing an example of process procedures for information cross-checking, registration and update according to the present modification. Note that since the same processes as those in Steps S301 to S305 and Steps S308 to S310 of FIG. 22 are included in FIG. 14, their explanations are omitted here, and the following explanation is given of the processes in Steps S306 and S307.

As shown in FIG. 22, in the case when in the input information group 22D, there is an information item in common with the device information or the management information of the DB 400 (Step S302: YES), the cross-checking subunit 242 further determines whether there are two or more of such common information items (Step S306).

If there are two or more common information items (Step S306: YES), the cross-checking subunit 242 refers to the checking order decision information 31D and decides the order for checking the match between item entries based on the predetermined checking order information (Step S307).

According to the decided checking order, the cross-checking subunit 242 determines whether, under the multiple common information items in the input information group 22D, item entries match those of the device information or the management information of the DB 400 (Step S308).

Thus, the device management apparatus 100 according to the present modification is capable of efficiently connecting appropriate input information to the device information by checking the match between item entries of the common information items in the order of higher match likelihood.

Conclusion

As has been described above, the device management apparatus 100 according to the present embodiment receives, prior to the installation of a device 200, an input of information which is to be connected to device information of the device 200, and stores the received information in a predetermined storage area (the input information holding unit 22) as the input information group 22D. In this condition, the device searching and device information acquiring unit 23 of the device management apparatus 100 detects the device 200 and acquires the device information from the detected device 200. Subsequently, the information registration and update control unit 24 of the device management apparatus 100 performs the following process.

The information registration and update control unit 24 refers to the input information group 22D to cross-check information items of the input information group 22D with those of device information of each detected device 200, and determines whether, in the input information group 22D, there is an information item in common with the device information. If there is a common information item, the information registration and update control unit 24 determines that the information connection can be established and acquires, from the input information group 22D, a piece of input information whose item entry of the common information item matches that of the device information. The information registration and update control unit 24 then connects the acquired information to the device information, and stores the connected information in a predetermined storage area (the registry management information holding unit 25) as the registry management information to thereby carry out data registration or update.

On the other hand, if there is no common information item between the device information and the input information group 22D, the information registration and update control unit 24 causes the DB information managing unit 27 to check whether there is a DB 400 having an information item in common with the device information. Subsequently, the information registration and update control unit 24 receives the check result, then makes an access to an appropriate DB 400 and acquires management information from the DB 400.

The information registration and update control unit 24 refers to the input information group 22D to cross-check information items of the input information group 22D with those of management information of each detected device 200, and determines whether, in the input information group 22D, there is an information item in common with the management information. If there is a common information item, the information registration and update control unit 24 determines that the information connection can be established and acquires, from the input information group 22D, a piece of input information whose item entry of the common information item matches that of the management information. The information registration and update control unit 24 then connects the acquired information to the management information, and stores the connected information in a predetermined storage area (the registry management information holding unit 25) as the registry management information to thereby carry out data registration or update.

Herewith, the device management apparatus 100 according to the present embodiment is able to, even if there is no common information item between information input preliminarily and device information of a device to be installed, dynamically connect the input information and the device information at the time of the installation of the device using an information item retrieved from another information source (DB), in common with the device information.

The preferred embodiments of the present invention have been shown and described herein. The "information management function" of the device management apparatus 100 is realized by the CPU 106 executing a program formed by coding each process procedure explained above with reference to the drawings in a programming language suitable for the operating environment (platform).

The program can be stored in the computer-readable recording medium 103a. Herewith, the program can be installed in the device management apparatus 100 via the drive unit 103 or the like. In addition, since the device management apparatus 100 has the interface unit 107, the program can also be installed by downloading via a telecommunications line.

The present invention may be a device management system in which, via a predetermined data transmission channel, one or more devices are connected to a device management apparatus for managing the devices. Each of the devices includes a device information transmitting unit configured to transmit device information of the device to the device management apparatus. The device management apparatus includes an input information holding unit configured to hold, in a first predetermined storage area, an input information group including one or more pieces of input information, each piece of which is to be connected to device information of a different one of the devices; a device search unit configured to detect the devices by a device search; a device information acquiring unit configured to acquire the device information from each of the detected devices; a cross-checking unit configured to, with reference to the input information group, cross-check information items of the pieces of input information with information items of the device information; and a registering and updating unit configured to carry out data registration or update by, in the case when the cross-checking unit determines that there is a common information item between the input information and the device information, connecting a piece of input information to the device information based on item entries of the piece of input information and the device information under the common information item, and storing the connected information in a second predetermined storage area as registry management information.

Also, the present invention may be an information management method applied to a device management apparatus that is connected to one or more devices via a predetermined data transmission channel and includes an input information holding unit configured to hold, in a predetermined first storage area, an input information group including one or more pieces of input information, each piece of which is to be connected to device information of a different one of the devices. The information management method includes a device search step of detecting the devices by a device search; a device information acquiring step of acquiring the device information from each of the detected devices; a cross-checking step of, with reference to the input information group, cross-checking information items of the pieces of input information with information items of the device information; and a registering and updating step of carrying out data registration or update by, in the case when the cross-checking unit determines that there is a common information item between the input information and the device information, connecting a piece of input information to the device information based on item entries of the piece of input information and the device information under the common information item, and storing the connected information in a second predetermined storage area as registry management information.

According to the procedures above, the information management method of the present invention achieves the operation of dynamically connecting information input preliminarily to device information of a device at the time of the installation of the device.

Herewith, the information management method according to the present invention is able to provide an environment in which the administrator is relieved from the operation of connecting various types of information handled in a user environment to device information.

In conclusion, according to the present invention, it is possible to provide a device management apparatus, a device management system, an information management method, an information management program and a recording medium storing the program therein, all of which are capable of relieving the administrator from the operation of connecting various types of information handled in a user environment to device information by dynamically connecting information input preliminarily to device information of a device at the time of the installation of the device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A device management apparatus connected to one or more devices via a predetermined data transmission channel, the device management apparatus comprising:
   an input information holding unit configured to hold, in a first predetermined storage area, an input information group including one or more pieces of input information, wherein each of the pieces is to be connected to device information of a different one of the devices;
   a device search unit configured to detect the devices by a device search;
   a device information acquiring unit configured to acquire the device information from the detected devices;
   a cross-checking unit configured to, with reference to the input information group, cross-check information items of the pieces of input information with information items of the device information; and
   a registering and updating unit configured to carry out data registration or update by, in a case when the cross-checking unit determines that there is a common information item between the input information and the device information, connecting a piece of input information to the device information based on item entries of the piece of input information and the device information under the common information item, and storing the connected information in a second predetermined storage area as registry management information.

2. The device management apparatus as claimed in claim 1, wherein when determining presence of the common information item, the cross-checking unit determines whether the item entries match each other, and acquires, from the input information group based on the matched item entries, the piece of input information to be connected to the device information.

3. The device management apparatus as claimed in claim 2, further comprising a data area creating unit configured to create a data area for storing the registry management information, wherein in a case when the device search unit detects an unregistered device, the data area creating unit creates, in the second storage area, a data area for the unregistered device, and the registering and updating unit carries out the data registration by storing the connected information in the created data area as the registry management information for the unregistered device.

4. The device management apparatus as claimed in claim 3, wherein in a case when the device search unit detects a registered device, the data area creating unit specifies, in the second storage area, a data area for the registered device, and the registering and updating unit carries out the data update by storing the connected information in the specified data area as the registry management information for the registered device.

5. The device management apparatus as claimed in claim 1, further comprising a database information managing unit configured to manage, as database information, information items of one or more databases connected to the device management apparatus via the data transmission channel and identification information of the databases, wherein when determining absence of the common information item between the input information and the device information, the cross-checking unit accesses a database specified by the database information managing unit and having an information item in common with the device information, and cross-checks the information items of the pieces of input information with the information items of the accessed database.

6. The device management apparatus as claimed in claim 5, wherein when determining absence of the common information item between the input information and the device information, the cross-checking unit makes a request with the database information managing unit to determine whether the database having the information item in common with the device information is present, and according to the request, the database information managing unit refers to the database information and transmits, to the cross-checking unit when a result of the check is affirmative, the identification information of the database having the common information item, and based on the transmitted identification information, the cross-checking unit accesses the database having the common information item.

7. The device management apparatus as claimed in claim 5, wherein when determining that, in the input information group, there is the information item in common with the accessed database, the cross-checking unit determines whether item entries under the common information item match each other, and acquires, from the input information group based on the matched item entries when a result of the check is affirmative, a piece of input information to be connected to the device information.

8. The device management apparatus as claimed in claim 5, wherein when determining that, in the input information group, there is no information item in common with the accessed database, the cross-checking unit makes a request with the database information managing unit to determine whether there is a different database having the information item in common with the accessed database, and according to the request, the database information managing unit refers to the database information and transmits, to the cross-checking unit when a result of the check is affirmative, the identification information of the different database, and based on the transmitted identification information, the cross-checking unit accesses the different database.

9. The device management apparatus as claimed in claim 1, wherein when determining that there are plural of the common information items between the input information and the device information, the cross-checking unit determines whether item entries of the respective common information items match each other according to a predetermined checking order, and acquires, from the input information group based on the matched item entries, the piece of input information to be connected to the device information.

10. The device management apparatus as claimed in claim 5, further comprising an update request receiving unit configured to receive a request for updating the registry management information, wherein when the update request receiving unit receives the request, the registering and updating unit updates an item entry of an appropriate information item in the registry management information, and makes a request with the database information managing unit to determine whether there is a database having the appropriate information item, and according to the request from the registering and updating unit, the database information managing unit refers to the database information and transmits, to the registering and updating unit when a result of the check is affirmative, the identification information of the database having the appropriate information item, and based on the transmitted identification information, the registering and updating unit updates the item entry of the database having the appropriate information item.

11. A device management system in which, via a predetermined data transmission channel, one or more devices are connected to a device management apparatus for managing the devices, wherein each of the devices includes a device information transmitting unit configured to transmit device information thereof to the device management apparatus, and the device management apparatus includes:

a device search unit configured to detect the devices by a device search;

a device information acquiring unit configured to acquire the device information from each of the detected devices;

a cross-checking unit configured to, with reference to the input information group, cross-check information items of the pieces of input information with information items of the device information; and a registering and updating unit configured to carry out data registration or update by, in a case when the cross-checking unit determines that there is a common information item between the input information and the device information, connecting a piece of input information to the device information based on item entries of the piece of input information and the device information under the common information item, and storing the connected information in a second predetermined storage area as registry management information.

12. A non-transitory computer-readable storage medium storing an information management program for causing a device management apparatus to execute a process, the device management apparatus being connected to one or more devices via a predetermined data transmission channel and including an input information holding unit configured to hold, in a predetermined first storage area, an input information group including one or more pieces of input information, wherein each of the pieces is to be connected to device information of a different one of the devices, the process comprising:

a device search step of detecting the devices by a device search;

a device information acquiring step of acquiring the device information from the detected devices;

a cross-checking step of, with reference to the input information group, cross-checking information items of the pieces of input information with information items of the device information; and a registering and updating step of carrying out data registration or update by, in a case when the cross-checking unit determines that there is a common information item between the input information and the device information, connecting a piece of input information to the device information based on item entries of the piece of input information and the device information under the common information item, and storing the connected information in a second predetermined storage area as registry management information.

* * * * *